US012105437B2

(12) United States Patent
Morimoto et al.

(10) Patent No.: US 12,105,437 B2
(45) Date of Patent: Oct. 1, 2024

(54) CHARGING DEVICE AND IMAGE FORMATION APPARATUS

(71) Applicant: Oki Electric Industry Co., Ltd., Tokyo (JP)

(72) Inventors: Daiki Morimoto, Tokyo (JP); Takaaki Ebe, Tokyo (JP); Junichi Kawashima, Tokyo (JP); Kohei Jougataki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/353,439

(22) Filed: Jul. 17, 2023

(65) Prior Publication Data

US 2024/0045352 A1 Feb. 8, 2024

(30) Foreign Application Priority Data

Jul. 28, 2022 (JP) ................................ 2022-120112
Jul. 28, 2022 (JP) ................................ 2022-120208
Mar. 17, 2023 (JP) ................................ 2023-043300

(51) Int. Cl.
*G03G 15/02* (2006.01)

(52) U.S. Cl.
CPC ..... *G03G 15/0233* (2013.01); *G03G 15/0258* (2013.01)

(58) Field of Classification Search
CPC ............ G03G 13/025; G03G 15/0233; G03G 2215/021; G03G 15/0818; G03G 15/162; G03G 15/1685; G03G 15/2057; G03G 15/206
USPC .......................................................... 399/176
See application file for complete search history.

(56) References Cited

U.S. PATENT DOCUMENTS

| | | | | |
|---|---|---|---|---|
| 8,781,369 B2 * | 7/2014 | Furukawa | G03G 15/0216 | 29/895.32 |
| 2011/0002711 A1 * | 1/2011 | Wada | G03G 15/0233 | 399/176 |
| 2014/0178110 A1 * | 6/2014 | Yagi | G03G 15/162 | 399/302 |
| 2017/0184992 A1 * | 6/2017 | Morimoto | G03G 15/0233 | |
| 2018/0101107 A1 * | 4/2018 | Tomomizu | G03G 15/0233 | |
| 2018/0364637 A1 * | 12/2018 | Kinokuni | G03G 15/0216 | |
| 2020/0209778 A1 * | 7/2020 | Morimoto | G03G 15/2064 | |
| 2021/0116829 A1 * | 4/2021 | Tomono | C08K 3/04 | |
| 2022/0066350 A1 * | 3/2022 | Otsuru | G03G 15/0233 | |
| 2022/0252997 A1 * | 8/2022 | Oura | G03G 15/0233 | |

FOREIGN PATENT DOCUMENTS

JP 2017-120381 A 7/2017

* cited by examiner

*Primary Examiner* — Robert B Beatty
(74) *Attorney, Agent, or Firm* — METROLEX IP LAW GROUP, PLLC

(57) ABSTRACT

A charging device according to one or more embodiments may include: a charging member that is rotatable and provided to be in contact with a contact member. The charging member includes: a shaft; a surface layer to be in contact with the contact member and containing porous particles; and an elastic layer provided between the shaft and the surface layer. A ratio of convex portions formed by the porous particles on the surface layer to a surface area of the surface layer is 68.4% or more.

12 Claims, 13 Drawing Sheets

CHARGING DEVICE AND IMAGE FORMATION APPARATUS

CROSS REFERENCE TO RELATED APPLICATIONS

This application claims priority based on 35 USC 119 from prior Japanese Patent Applications No. 2023-043300 filed on Mar. 17, 2023, No. 2022-120208 filed on Jul. 28, 2022, and No. 2022-120112 filed on Jul. 28, 2022, the entire contents of each of which are incorporated herein by reference.

BACKGROUND

The disclose may relate to a charging device for charging an image carrier and an image formation apparatus provided with a charging device.

An image formation apparatus using an electrophotographic process includes a charging roller (charging member) that contacts a photosensitive drum (contact member) to uniformly charge the surface of the photosensitive drum.

Patent Document 1 (Japanese Patent Application Laid-Open No. 2017-120381, see Abstract) proposes dispersing large particles and small particles on the surface of the charging roller in order to suppress streaks caused by exudation of the components of the elastic layer of the charging roller.

SUMMARY

However, in a related art, since a contact area between the charging roller and the photosensitive drum is small, a charging state of the photosensitive drum (contact member) may become unstable, resulting in printing defects called a fog (fogging).

An object of one or more embodiment of the disclosure may be to reduce printing defects caused by unstable charge state of a contact member such as a photosensitive drum.

An aspect of one or more embodiment may be a charging device that may include: a charging member that is rotatable and provided to be in contact with a contact member. The charging member includes: a shaft; a surface layer to be in contact with the contact member and containing porous particles; and an elastic layer provided between the shaft and the surface layer. A ratio of convex portions formed by the porous particles on the surface layer to a surface area of the surface layer is 68.4% or more.

According to the aspect described above, it may be possible to reduce printing defects caused by poor charging of a contact member.

DETAILED DESCRIPTION

Figure 1:
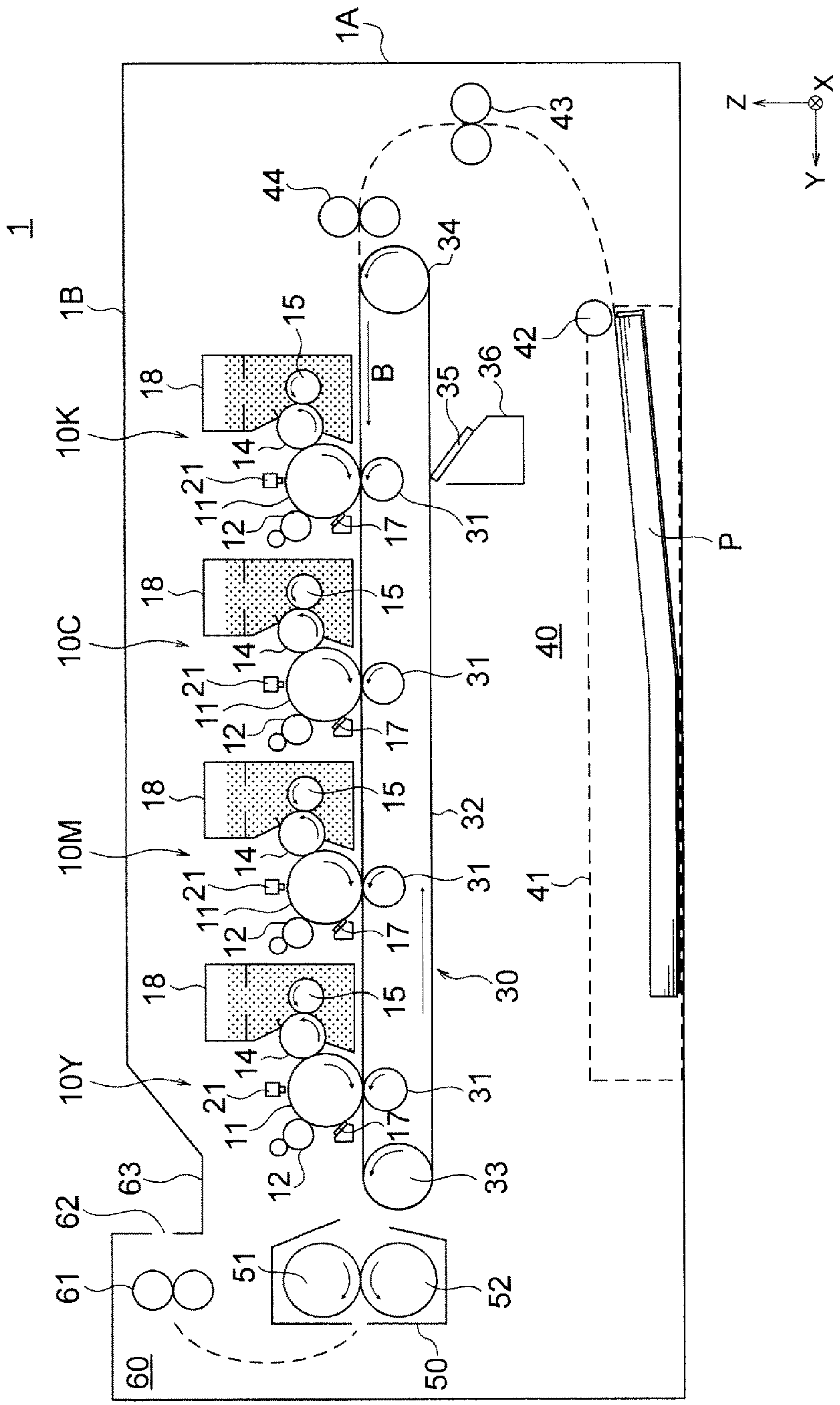
FIG. 1 is a diagram illustrating a configuration of an image formation apparatus according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

First Embodiment (Configuration of Image Formation Apparatus)

An image formation apparatus according to a first embodiment is described. FIG. 1 is a diagram illustrating a view of an image formation apparatus 1 according to a first embodiment. The image formation apparatus 1 is configured to form a color image by an electrophotographic method, and is, for example, a color printer. Note that the image formation apparatus 1 is not limited to a color printer and may be a monochrome printer.

The image formation apparatus 1 includes a media supply unit 40 configured to supply a medium P such as a printing paper or the like, image formation units 10K, 10C, 10M, and 10Y configured to form toner images (developer images) of black (K), cyan (C), magenta (M), and yellow (Y), a transfer unit 30 configured to transfer the toner images to the medium P, a fixation device 50 configured to fix the toner images to the medium P, and a media discharge unit 60 configured to discharge the medium P.

The medium supply section 40 includes a medium tray 41, a hopping roller 42, a pair of regist rollers 43, and a pair of conveyance rollers 44. The medium tray 41 accommodates the media P in a stacked state. The medium P is, for example, printing paper, an OHP sheet, an envelope, copy paper, special paper, etc. The hopping roller 42 is rotated by a driving force of a conveyance motor 45 (FIG. 6), and feeds the media P from the media tray 41 to a conveyance path one by one.

The pair of the regist rollers 43 are rotated by the driving force of the conveyance motor 45 (FIG. 6), and conveys the medium P fed from the medium tray 41 along the conveyance path. The pair of resist rollers 43 correct the skew of the medium P when the leading end of the medium P comes in contact with a nip between the rollers 43, and then starts rotating at a predetermined time after the leading end of the medium P comes in contact with the nip between the rollers 43 so as to convey the medium P. The pair of conveyance rollers 44 are rotated by the driving force of the conveyance motor 45 (FIG. 6), and conveys the medium P to the transfer unit 30 along the conveyance path.

The image formation units 10K, 10C, 10M, and 10Y are arranged from upstream to downstream (from right to left in FIG. 1) along the medium conveyance path. The image formation units sections 10K, 10C, 10M, and 10Y may be referred to as image formation units 10 when there is no need to distinguish between them.

An exposure head 21 as an exposure device is located so as to be opposed to a photosensitive drum 11 (described later) of each image formation unit 10. The exposure head 21 includes an array of LEDs (light emitting diodes) as light emitting elements and is configured to irradiate light onto the surface of the photosensitive drum 11. The exposure heads 21 are suspended and supported by a top cover 1B that covers an upper portion of a housing 1A. Also, laser elements may be used instead of the LEDs.

(Configuration of Image Formation Unit)

Figure 2:
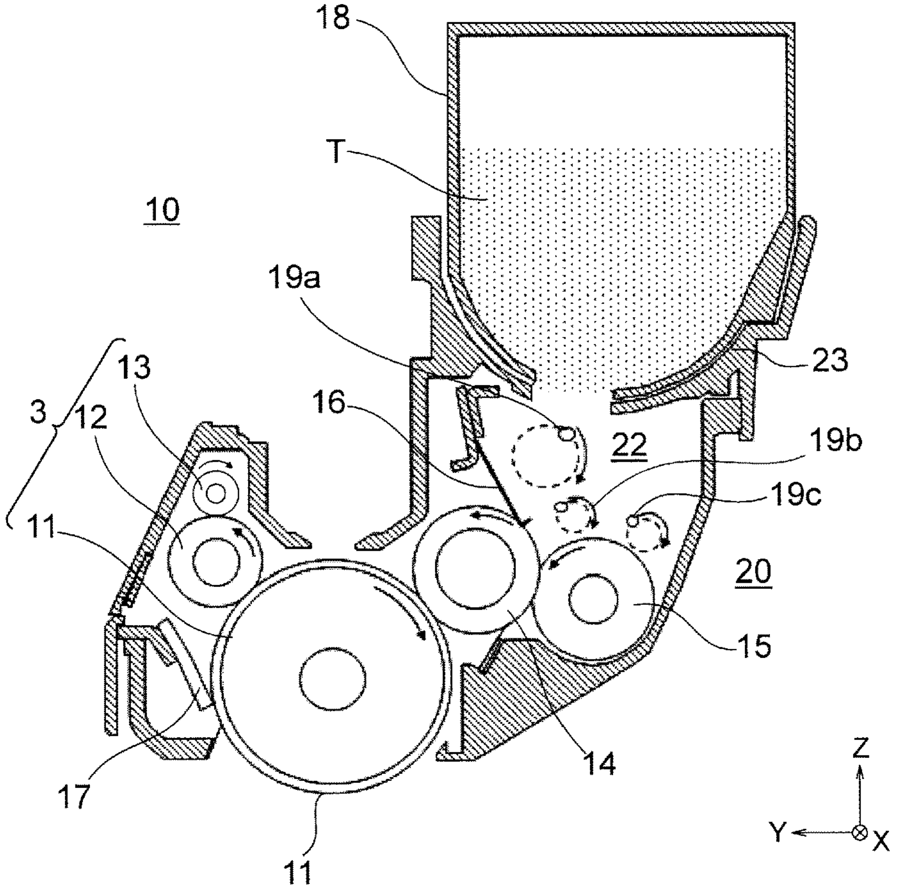
FIG. 2 is a diagram illustrating a configuration of an image formation section according to a first embodiment.

FIG. 2 is a diagram illustrating a view of a configuration of the image formation unit 10. The image formation unit 10 includes a charging device 3 including: the photosensitive drum 11 as an image carrier; a charging roller 12 as a charging member; and a cleaning roller 13 as a cleaning member.

The image formation unit 10 further includes a development roller 14 as a developer carrier, a supply roller 15 as a supply member, a development blade 16 as a layer regulation member, and a cleaning blade 17. On the main body of the image formation unit 10, a toner cartridge 18 as a developer container is mounted.

In the above configuration, the photosensitive drum 11 as an image carrier functions as a contact member (or a contact target member) to be in contact with the charging roller 12. The cleaning roller 13 as a cleaning member also functions as a contact member to be in contact with the charging roller 12.

Note that the charging device 3 includes at least the charging roller 12 as a charging member that is rotatable and contactable with the contact member. The charging device 3 may include at least the charging roller 12 as a charging member and the photosensitive drum 11 as a contact member (or a contact-target member). Further, the charging device 3 may include at least the charging roller 12 as a charging member and the cleaning roller 13 as a contact member (or a contact-target member).

The photosensitive drum 11 is a cylindrical member including a charge generation layer and a charge transport layer layered on the surface of a cylindrical conductive support body. The photosensitive drum 11 is rotated in the rotational direction (a clockwise direction in FIG. 1). the photosensitive drum 11 is configured to carry the electrostatic latent image on the surface thereof. The photosensitive drum 11 is described in detail later.

The charging roller 12 is disposed to be in contact with the surface of the photosensitive drum 11 and is configured to rotate along with the rotation of the photosensitive drum 11. The charging roller 12 is applied with a charging voltage from a power supply 111 (FIG. 6) for the charging roller to uniformly charge the surface of the photosensitive drum 11.

The cleaning roller 13 is arranged so as to be in contact with the surface of the charging roller 12 and rotates following the rotation of the charging roller 12. The cleaning roller 13 removes foreign matter adhered to the surface of the charging roller 12 so as to clean the surface of the charging roller 12.

The development roller 14 is located in contact with the surface of the photosensitive drum 11 and configured to rotate in a direction opposite to that of the photosensitive drum 11 (that is, at a contact portion between the development roller 14 and the photosensitive drum 11, the direction in which the surface of the development roller 14 moves is the same as the direction in which the surface of the photosensitive drum 11 moves). The development roller 14 is applied with a developing voltage from a power supply 112 (FIG. 6) for the development roller and configured to develop the electrostatic latent image on the surface of the photosensitive drum 11 with the toner (the developer).

The supply roller 15 is located in contact with the surface of the development roller 14 and configured to rotate in the same direction as the development roller 1 (that is, at a contact portion between the supply roller 15 and the development roller 14, the direction in which the surface of the supply roller 15 moves is opposite to the direction in which the surface of the development roller 14 moves). The supply roller 15 is applied with a supply voltage from a power supply 113 (FIG. 6) for the supply roller and supplies the toner to the development roller 14.

The development blade 16 is a blade located in contact with the surface of the development roller 14. The development blade 16 is applied with a blade voltage from a power supply 114 (FIG. 6) for the development blade and regulates the toner layer on the surface of the development roller 14 to a constant thickness.

A portion of the image formation unit 10 that includes the development roller 14, the supply roller 15 and the development blade 16 constitutes a development unit 20 or a development device. The development unit 20 includes a toner storage 22 in which the toner to be used for the development is stored. In the toner storage 22, crank-shaped agitating bars 19*a*, 19*b*, and 19*c* configured to agitate and convey the toner are arranged in addition to the development roller 14, the supply roller 15, and the development blade 16.

The image formation unit 10 includes a cartridge mounting section 23 provided above the development unit 20. The toner cartridge 18 as the developer container is detachably mounted to the cartridge mounting section 23. The toner cartridge 18 is a container that stores therein the toner (indicated by symbol T) as a developer, and supplies the toner to the toner storage 22 of the development unit 20.

The cleaning blade 17 is provided to be in contact with the surface of the photosensitive drum 11 and is configured to scrape off the toner remaining on the surface of the photosensitive drum 11. The waste toner scraped off by the cleaning blade 17 is transported to a waste toner collection section by a transport screw (not illustrated).

As illustrated in FIG. 1, the transfer unit 30 includes four transfer rollers 31 as transfer members provided so as to be respectively opposed to the photosensitive drums 11 of the image formation units 10, a conveyance belt 32 configured to pass between the photosensitive drums 11 and the transfer rollers 31, and a drive roller 33 and a driven roller 34 between which the conveyance belt 32 is stretched.

The transfer unit 30 also includes a belt cleaning member 35 that removes the residual toner remaining on the conveyance belt 32 and a waste toner storage 36 that stores therein the residual toner removed by the belt cleaning member 35.

The conveyance belt 32 is an endless belt made of a highly resistive semi-conductive plastic film. The conveyance belt 32 includes a glossy surface, and conveys the medium P with attaching and holding the medium P on the surface of the conveyance belt 32.

The drive rollers 33 are driven to be rotated by a drive motor 108 (see FIG. 6), to cause the conveyance belt 32 to run in a direction indicated by the arrow B. The driven roller 34 applies the tension to the conveyance belt 32.

The transfer roller 31 includes a semiconductive elastic layer formed on the surface of a metal shaft. The transfer roller 31 is applied with a transfer voltage from a power supply 115 (FIG. 6) for the transfer roller and configured to transfer the toner image from the surface of the photosensitive drum 11 to the medium P on the conveyance belt 32.

Figure 6:
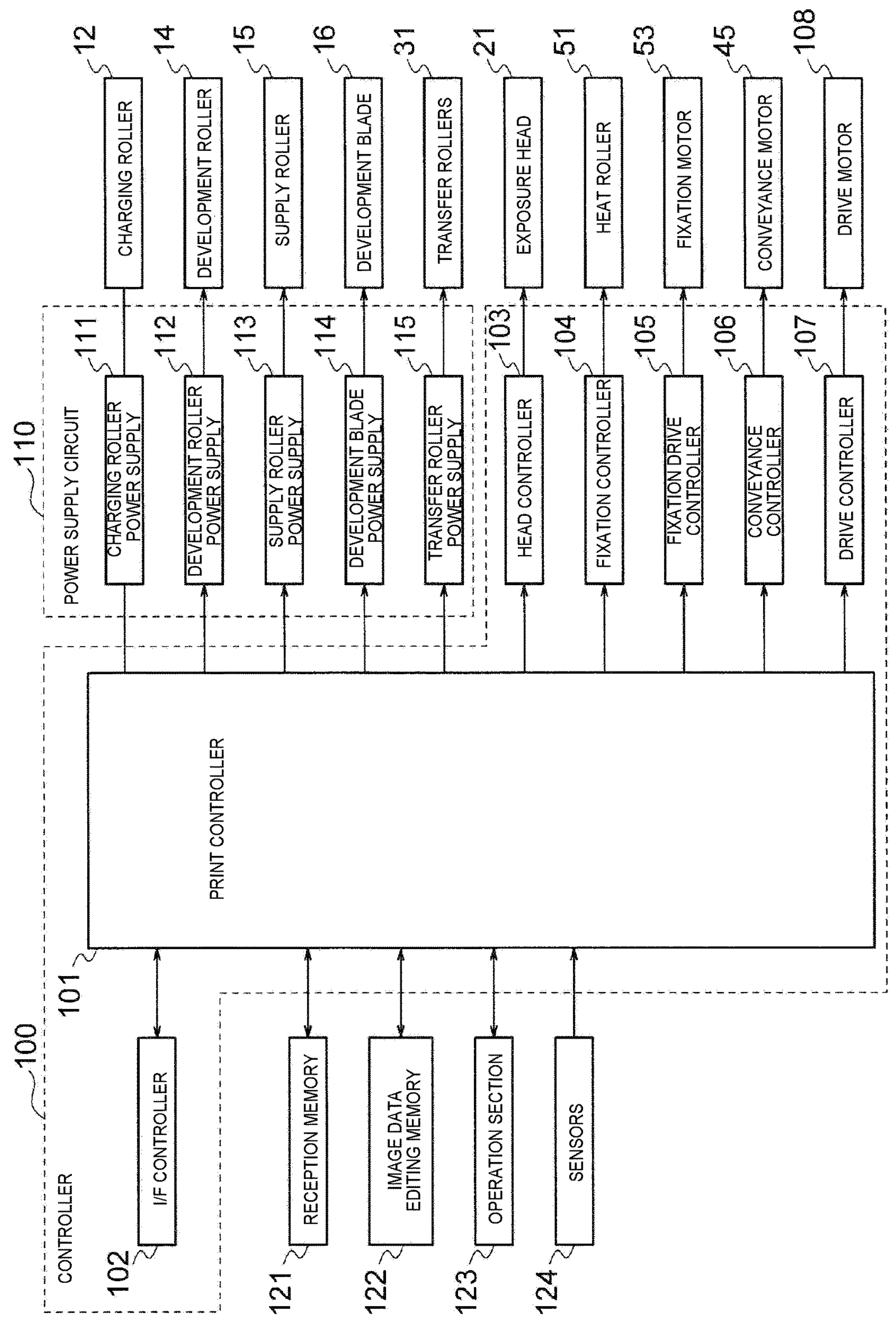
FIG. 6 is a block diagram illustrating a view of a control system of the image formation apparatus according to a first embodiment.

The fixation device 50 includes a heat roller 51 and a pressure roller 52. The heat roller 51 includes a heater, such as a halogen lamp or the like, built therein. The heat roller 51 is rotated by a driving force of a fixation motor 53 (FIG. 6).

The pressure roller 52 is in press contact with the heat roller 51 and thus forms a fixation nip between the pressure roller 52 and the heat roller 51. The hear roller 51 and the pressure roller 52 apply pressure and heat on the toner transferred on the medium P, and thereby fix the toner onto the medium P.

The media discharge unit 60 is arranged on the downstream side of the fixation device 50 in the conveyance direction of the medium P. The media discharge unit 60 includes a pair of discharge rollers 61 that discharge the medium P that has passed through the fixation device 50 from a discharge port 62 to the outside of the image formation apparatus. The pair of discharge rollers 61 are driven to rotate by the rotation transmitted from the fixation motor 53 (FIG. 6) so as to discharge the medium P from the discharge port 62. The upper portion of the top cover 1B includes a stacker 63 on which the discharged media P are stacked.

In FIG. 1, an axial direction of the photosensitive drum 11 is referred to as an X direction. The X direction is parallel to an axial direction of each roller in the image formation apparatus 1 and also is parallel to a width direction of the medium P being conveyed. A movement direction of the medium P as the medium P passes through the image formation unit 10 is referred to as a Y direction. The direction orthogonal to the X direction and the Y direction is referred to as a Z direction. In this case, the Z direction is the vertical direction.

(Components of Image Formation Unit)

Next, each component of the image formation unit 10 is described in more detail. First, components (the photosensitive drum 11, the charging roller 12, and the cleaning roller 13) of the charging device 3 of the image formation unit 10 are described below.

(Charging Device)

Figure 3:
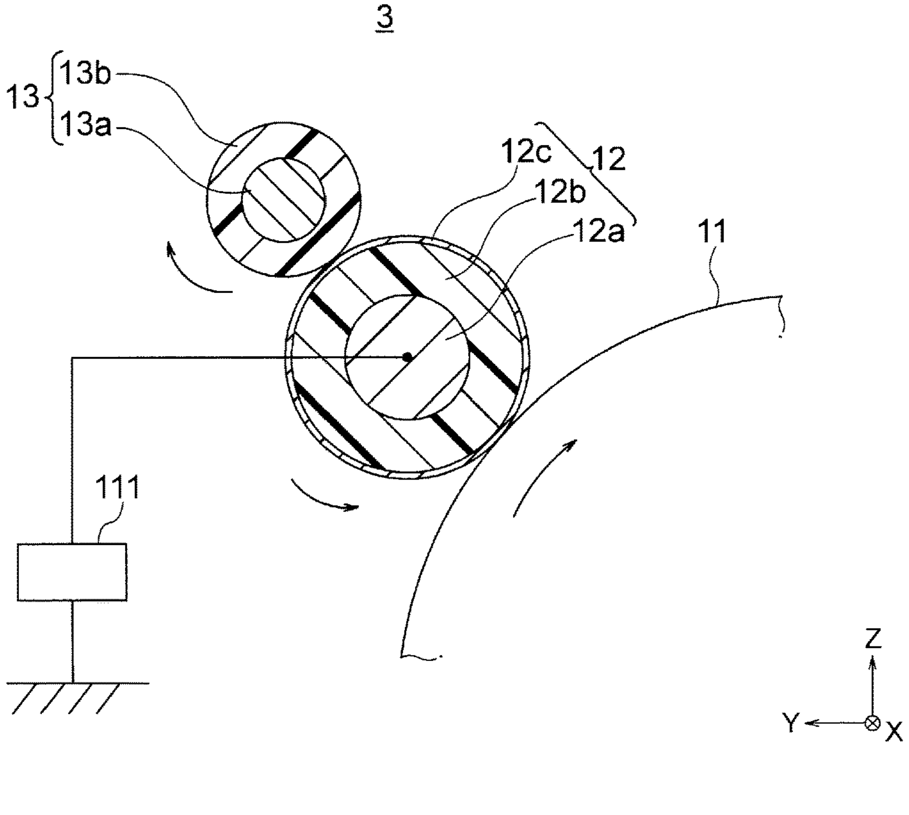
FIG. 3 is a diagram illustrating a configuration of a charging device according to a first embodiment.

FIG. 3 is a diagram illustrating a view of the charging device 3. The charging device 3 includes the photosensitive drum 11, the charging roller 12, and the cleaning roller 13. The charging roller 12 is arranged in contact with the surface of the photosensitive drum 11 with a nip between the photosensitive drum 11 and the charging roller 12. The nip pressure is, for example, 700 (gf). The cleaning roller 13 is arranged such that the cleaning roller 13 is in contact with the surface of the charging roller 12. The charging roller 12 and the cleaning roller 13 constitute a charging section or a charging device that charges the surface of the photosensitive drum 11.

Specifically, the nip pressure can be measured by a roller-to-roller pressure distribution measurement system "PINCH" (manufactured by Nitta Corporation) using a sensor sheet (PINCH A4-40 NS-SET-PA4-40).

(Charging Roller)

The charging roller 12 includes a core metal 12*a* as a shaft, an elastic layer 12*b* formed on the surface of the core metal 12*a*, and a surface layer 12*c* covering the surface of the elastic layer 12*b*. The core metal 12*a* and the elastic layer 12*b* are formed of materials having conductivity.

The core metal 12*a* is formed of metal such as electroless nickel-plated free-cutting steel (SUM) or stainless steel (SUS). The elastic layer 12*b* is formed of rubber, thermoplastic elastomer, resin, or the like so as to form a nip between the elastic layer 12*b* and the photosensitive drum 11 in which a proper electric discharge occurs. The elastic layer 12*b* may be a single layer or may have a multilayer structure of two or more layers.

The elastic layer 12*b* is made of, for example, a rubber composition whose main component is one of or a mixture of two of epichlorohydrin rubber (CO, ECO, GECO), ethylene propylene rubber (EPM, EPDM), acrylonitrile-butadiene rubber (NBR), hydrogenated acrylonitrile-butadiene rubber (H-NBR), styrene-butadiene rubber (SBR), butadiene rubber (BR), isoprene rubber (IR), chloroprene rubber (CR), urethane rubber, silicone rubber, etc.

In particular, it may be preferable to use rubber containing epichlorohydrin rubber (ECO) as a main component or rubber containing a mixture of epichlorohydrin rubber (ECO) and acrylonitrile-butadiene rubber (NBR) as a main component. In a first embodiment, a rubber that contains epichlorohydrin rubber (ECO) as a main component thereof is used.

If the electrical resistance of the elastic layer 12*b* is too high, the surface of the photosensitive drum 11 would be unevenly charged or overcharged, resulting in poor printing. Conversely, if the electrical resistance of the elastic layer 12*b* is too low, current leakage due to scratches on the surface of the photosensitive drum 11 would cause poor printing. Therefore, the electrical resistance of the elastic layer 12*b* may need to be set in an appropriate range. In order to set the electric resistance of the elastic layer 12*b* in such an appropriate range, the elastic layer 12*b* is added with an ion-conductive material, an ion-conducting agent, a carbon black, a metallic oxide, or the like to provide a predetermined conductivity.

The elastic layer 12*b* may have electronic conductivity or ionic conductivity. Partial resistance unevenness of the elastic layer 12*b* is likely to lead to charging unevenness of the photosensitive drum 11. Therefore, an elastic layer having ionic conductivity is often used from the viewpoint of suppressing such resistance unevenness. However, an elastic layer having electronic conductivity may be used.

It may be preferable that the volume resistivity of the elastic layer 12*b* is 106 to 1090. In a case where the charging roller 12 has ionic conductivity, the volume resistance value varies depending on the temperature and humidity. Here, the volume resistance values are the values measured under an environment of 20° C. and relative humidity of 50%.

The hardness of the elastic layer 12*b* is adjusted such that a minute gap is formed between the surface of the charging roller 12 and the surface of the photosensitive drum 11 so as to generate proper discharge based on Paschen's law. For measuring the hardness of the elastic layer 12*b*, peak measurement is performed using a micro rubber hardness tester "MD-1capa" (Type_A) manufactured by Kobunshi Keiki Co., Ltd. When measured by this method, it may be preferable that the hardness of the elastic layer 12*b* is in the range of 35 degrees to 80 degrees. In the case where the hardness of the elastic layer 12*b* is within the range of 35 degrees to 80 degrees, eccentricities or variations in shapes of the charging roller 12 and the photosensitive drum 11 can be absorbed. However, the hardness range is not limited to the above described range as long as an appropriate nip is formed between the charging roller 12 and the photosensitive drum 11.

The surface (that is, the outer peripheral surface) of the elastic layer 12*b* is given a predetermined surface roughness by cutting, polishing, molding, or the like. It may be preferable that the ten-point average roughness Rz of the charging roller 12 is, for example, approximately 1 to 30 μm according to Paschen's law, although depending on the applied voltage and the usage environment. The surface of the elastic layer 12*b* may be subjected to surface treatment, coating, ultraviolet irradiation, or electron beam irradiation. These treatments can prevent contamination of the photosensitive drum 11 or adjust the resistance of the elastic layer 12*b*. In addition, with these treatments, the toner and/or external additive thereof adhered to the photosensitive drum 11 are less likely to be adhered to the surface of the charging roller 12.

The surface layer 12*c* is formed by coating the surface of the elastic layer 12*b* with a solution obtained by mixing urethane-based polymer and porous particles in ethyl acetate (solvent) (see Examples 1-1 to 1-5 described below). The application is performed by dipping, spraying, coating, or the like. Note that the urethane-based polymer is a homopolymer or copolymer having a urethane bond formed by condensation of an isocyanate group and an alcohol group.

For forming the surface layer 12*c*, toluene diisocyanate (TDI), methylene diisocyanate (MDI), xylylene diisocyanate (XDI), naphthalene diisocyanate (NDI), hexamethylene diisocyanate (HDI), isophorone diisocyanate (IPDI), polyester polyols, polycarbonate polyols, silicone diols, acrylic fluorine-based polymers, acrylic silicone-based polymers, fluorine-based polymers, and a multimer or modified product thereof, and the like can be used, for example. In addition, a conductive agent such as carbon black, an ionic conductive agent, an electronic conductive agent, etc. can be added as necessary.

As the porous particles contained in the surface layer 12*c*, one of or a combination of two or more of urethane resins, acrylic resins, nylon resins, fluorine resins, polyamide resins, polycarbonate resins, polyester resins, isocyanate resins, etc. can be used for example.

Here, as an example, the core metal 12*a* of the charging roller 12 has an outer diameter of 8 mm, and the elastic layer 12*b* has an outer diameter of 12 mm.

(Cleaning Roller)

The cleaning roller 13 includes a core metal 13*a* as a shaft and an elastic layer 13*b* formed on the surface of the core metal 13*a*. The core metal 13*a* is made of metal such as electroless nickel-plated free-cutting steel (SUM), stainless steel (SUS), or the like, or made of resin such as polyacetal (POM), or the like. The elastic layer 13*b* may be a single layer, or may have a multilayer structure of two or more layers. The elastic layer 13*b* may contain foam, or may have a two-layer structure of a solid layer and a foam layer. In addition, the elastic layer 13*b* may cover the entire surface of the core metal 13*a* except for the axial end portions thereof, or may spirally cover the surface of the core metal 13*a*. The elastic layer 13*b* of the cleaning roller 13 may only need to have the function of cleaning the surface of the charging roller 12.

The elastic layer 13*b* is made of one type or a mixture of two or more types of foamed resin such as polyurethane, polyethylene, polyamide, polypropylene, and the like and rubber such as silicone rubber, fluororubber, urethane rubber, ethylene propylene rubber (EPM, EPDM), ethylene propylene rubber (EPM, EPDM), acrylonitrile-butadiene rubber (NBR), hydrogenated acrylonitrile-butadiene rubber (H-NBR), styrene-butadiene rubber (SBR), butadiene rubber (BR), isoprene rubber (IR), chloroprene rubber (CR), and the like. Auxiliaries such as foaming aids, foam stabilizers, catalysts, curing agents, plasticizers, vulcanization accelerators, or the like may be added as necessary.

Among the materials described above, it may be particularly preferable that the elastic layer 13*b* is made of a material having cells (that is, a foam) from the viewpoint of the function of removing foreign matter from the surface of the charging roller 12. In particular, in order to suppress damage to the surface of the charging roller 12 due to friction and to prevent the elastic layer 13*b* from being torn or damaged over a long period of time, it may be preferable that a polyurethane foam, which is resistant to tearing and pulling, is used for the elastic layer 13*b*.

Specifically, it may be preferable that the elastic layer 13*b* is a material that has the density (apparent density) according to Japanese Industrial Standards JIS_K7222 is 20 to 80 kg/m3, the 25% compression hardness according to JIS_K6400-2 is 100 to 410 N, and a tensile strength according to JIS_K6400-5 is 60 to 300 kPa and an elongation according to JIS_K6400-5 is 100% to 220%.

The cleaning roller 13 used in a first embodiment includes the core metal 13*a* made of free-cutting steel plated with electroless nickel, and the elastic layer 13*b* made of polyurethane foam. As the polyurethane foam of the elastic layer 13*b*, "Moltoprene SM-55" (product name) manufactured by HONG KONG FIT CO., LTD. is used. The outer diameter of the core metal 13*a* is set to 4 mm, and the outer diameter of the elastic layer 13*b* is set to 5.7 mm.

(Photosensitive Drum)

Figure 4A:
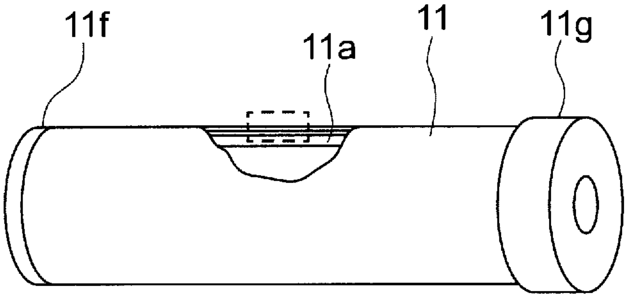
FIGS. 4A and 4B are diagrams illustrating a cross-sectional structure of a photosensitive drum according to a first embodiment.
Figure 4B:
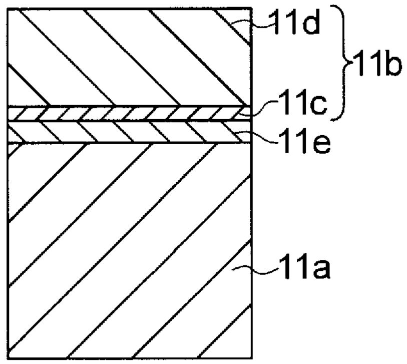

Next, the photosensitive drum 11 serving as the image carrier is described. FIG. 4A is a diagram illustrating a cross-sectional structure of the photosensitive drum 11. FIG. 4B is a diagram illustrating an enlarged cross sectional view of a part of the photosensitive drum 11 illustrated in FIG. 4A.

The photosensitive drum 11 is a member configured to carry on the surface (surface layer portion) thereof an electrostatic latent image. As illustrated in FIG. 4A, the photosensitive drum 11 is a cylindrical member formed with a drum gear 11*g* at one end portion thereof in the axial direction and a drum flange 11*f* at the other end portion thereof in the axial direction. The drum gear 11*g* is a part that receives transmission of a driving force from the drive motor 108 (FIG. 6). The outer diameter of the cylindrical portion of the photosensitive drum 11 (the portion excluding the drum gear 11*g* and the drum flange 11*f*) is, for example, 30 mm.

As illustrated in FIG. 4B, the photosensitive drum 11 includes a conductive support 11*a*, and a photoconductive layer 11*b* covering the surface of the conductive support 11*a*. The conductive support 11*a* is, for example, a pipe made of metal such as aluminum or stainless steel. The photoconductive layer 11*b* has a multi-layered structure including a charge generation layer 11*c* and a charge transport layer 11*d* are stacked in order. An undercoat layer 11*e* may be formed between the conductive support 11*a* and the photoconductive layer 11*b*.

Main components of the charge generation layer 11*c* are charge generating substances and binder resin. As the charge generating substances, various organic pigments and organic dyes can be used. In particular, metal-free phthalocyanines, metals such as copper, indium, gallium, tin, titanium, zinc and vanadium, and phthalocyanines coordinated with oxides and chlorides thereof are preferable. Azo pigments such as monoazo, hisazo, trisazo and polyazo are also preferred.

The binder resin of the charge generating layer 11*c* is, for example, a polyester resin, polyvinyl acetate, polyacrylic ester, polymethacrylic ester, polyester, polycarbonate, polyvinyl acetoacetal, polyvinyl propional, polyvinyl butyral, phenoxy resin, epoxy resin, urethane resin, cellulose ester, cellulose ether, or the like.

Main components of the charge transport layer 11*d* are charge transport substances and binder resin. Used as the charge transport substances is, for example, heterocyclic compounds such as carbazole, indole, imidazole, oxazole, pyrazole, oxadiazole, pyrazoline, thiadiazole or the like, aniline derivatives, hydrazone compounds, aromatic amine derivatives, stilbene derivatives, polymers comprising one or more of these compounds in the main chain or side chain, or other electron donating substances.

Examples of the binder resin of the charge transport layer 11*d* include polycarbonate, polymethyl methacrylate, polystyrene, vinyl polymer such as polyvinyl chloride, polyester, polyester carbonate, polysulfine, polyimide, phenoxy, epoxy, silicone resin, or polymers thereof or partially cross-linked cured products thereof, for example. Polycarbonate is particularly suitable among the above examples for the binder resin of the charge transport layer 11*d*. Additives such as antioxidants, sensitizers, and the like may be included as necessary.

(Toner)

Next, the toner is described. The toner is a non-magnetic one-component negatively-chargeable toner. The toner has an average particle size of approximately 6.0 μm and a circularity of approximately 0.96. For the measurement of the average particle size, "Multisizer 3" manufactured by Coulter, Inc. is used. For measurement of the circularity, "flow type particle image analyzer FP IA-3000" manufactured by Sysmex Corporation is used.

The toner is obtained by adding external additive such as inorganic fine powder or organic fine powder to toner base particles containing at least a binder resin.

It may be preferable that the binder resin is polyester resin, styrene-acrylic resin, epoxy resin, or styrene-butadiene resin. The binder resin may be obtained by mixing multiple types of binder resin. Here, a mixture of two or more types of amorphous polyester resin and a crystalline polyester resin having a crystal structure is used as the binder resin.

A release agent, a coloring agent (colorant), and/or the like are added to the binder resin. In addition to these, additives such as charge control agents, conductivity modifiers, fluidity improvers, and cleanability improvers may be added.

Examples of the release agent include, which are however not particularly limited to, low-molecular-weight polyethylene, low-molecular-weight polypropylene, copolymers of olefins, aliphatic hydrocarbon waxes such as microcrystalline wax, paraffin wax, Fischer-Tropsch wax, oxide of aliphatic hydrocarbon wax such as oxidized polyethylene wax, block copolymers thereof, waxes mainly composed of fatty acid esters such as montan acid ester wax, carnauba wax, and a partly or wholly deoxidized fatty acid esters such as deoxidized carnauba wax. The content amount of the release agent is preferably 0.1 to 20 (parts by weight), more preferably 0.5 to 12 (parts by weight), with respect to 100 (parts by weight) of the binder resin. Also, a plurality of waxes may be used together.

The coloring agent is not particularly limited, but dyes, pigments, and the like generally used as coloring agents for yellow, magenta, cyan, and black toners can be used singly or in combination. Specifically, for example, carbon black, iron oxide, Phthalocyanine Blue, Permanent Brown FG, Brilliant First Scarlet, Pigment Green B, Rhodamine-B base, Solvent Red 49, Solvent Red 146, Pigment Blue 15:3, Solvent Blue 35, Quinacridone, Carmine 6B, Disazo Yellow and the like can be used. The content amount of the coloring agent is preferably 2 to 25 (parts by weight), more preferably 2 to 15 (parts by weight), added to 100 (parts by weight) of the binder resin.

As the charge control agent, known ones can be used. In the case of a negatively chargeable toner, the charge control agent is, for example, an azo-complex charge-control agent, a salicylic acid-complex charge-control agent, a calixarene charge-control agent, or the like. The content amount of the charge control agent is preferably 0.05 to 15 (parts by weight), more preferably 0.1 to 10 (parts by weight), added to 100 (parts by weight) of the binder resin.

The external additives are added to improve environmental stability, electrification stability, development properties, flowability, and storage stability, and can be a known one. The content amount of the external additives is 0.01 to 10 (parts by weight), preferably 0.05 to 8 (parts by weight), to 100 (parts by weight) of the binder resin. In this example, several types of silica having an average particle size of 14 μm (silica having positive charging polarity and silica having negative charging polarity), and colloidal silica having an average particle size of 110 μm (negative charging polarity) and melamine having an average particle size of 200 μm (positive charging polarity) are added to 100 (parts by weight) of the base particles, such that the total amount of the external additive is fallen within the above range.

The toner charge amount (blow-off charge amount) is measured after agitating the toner and the carrier by shaking.

Here, a ferrite carrier "EF96-35" manufactured by Powdertech Co., Ltd. is used as a carrier, and 0.5 g (grams) of toner and 9.5 g of the carrier are mixed. 150 mg (milligrams) of the mixture of the toner and the carrier is placed in a container and shaken using a shaker "YS-LD" manufactured by Yayoi Co., Ltd. The number of times of shaking is 200 (times/minute), and the shaking time is 300 seconds.

After the shaking, a suction is performed for 10 seconds using a powder charge amount measuring device "TB-203" manufactured by Kyocera Chemical Co., Ltd., with the blow pressure of 7.0 kPa and the suction pressure of −4.5 kPa, and the amount of charge and the amount of suction every 0.1 seconds are output to a PC (personal computer). The charge amount Q/M per unit weight of the toner particles calculated from the respective average values of the charge amount and the suction amount output during the last 2 seconds of the suction time (10 seconds) is approximately −35 μC/g. The measurement is performed at a temperature of 25° C. and a relative humidity of 50%.

(Development Roller)

Figure 5A:
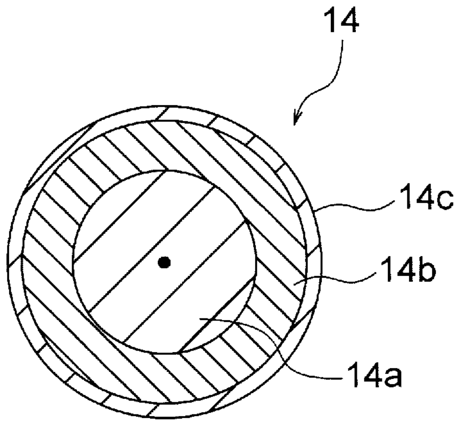
FIG. 5A is diagram illustrating a cross-sectional structure of a development roller according to a first embodiment and FIG. 5B is diagram illustrating a cross-sectional structure of a supply roller according to a first embodiment.

Next, the development roller 14 is described. FIG. 5A is a diagram illustrating a cross-sectional structure of the development roller 14. The development roller 14 includes a conductive core metal 14*a*, an elastic layer 14*b* formed on the surface of the core metal 14*a*, and a surface layer 14*c* covering the surface of the elastic layer 14*b*. The core metal 14*a* is made of, for example, metal such as iron, aluminum, or stainless steel, or the like.

The elastic layer 14*b* is made of a general rubber material such as silicone rubber, urethane, or the like. In the case where polyurethane is used for the elastic layer 14*b*, it may be preferable that polyurethane is mainly composed of polyether-based polyol. The ether-based polyurethane is a so-called cast-type polyurethane obtained by reacting a polyol mainly composed of polyether-based polyol with a polyisocyanate. This is to reduce the compression set. On the other hand, when an ester-based polyurethane is used, the ester-based polyurethane has poor hydrolysis properties and cannot be used stably over a long period of time.

In the case where polyurethane is used for the elastic layer 14*b*, examples of the isocyanate to be reacted with the polyol may include triphenylmethane triisocyanate, tris (isocyanatophenyl) thiophosphate, bicycloheptane triisocyanate, and the like, and a mixture such as nelate-modified polyisocyanate of hexamethylene diisocyanate, polymeric MDI, etc.

Moreover, a mixture of these trifunctional or more polyisocyanate and a general difunctional isocyanate compound may be used as the polyurethane of the elastic layer 14*b*. Examples of bifunctional isocyanate compounds include 2,4-tolylene diisocyanate (TDI), 4,4-diphenylmethane diisocyanate (MDI), paraphenylene diisocyanate (PPDI), 1,5-naphthalene diisocyanate (NDI), 3,3-dimethyldiphenyl-4,4-diisocyanate (TODD, a modified product or multimer such as prepolymers having these isocyanates at both ends, and the like.

The elastic layer 14*b* is formed by adding carbon black to the above-described rubber base material and heating and curing the carbon black while maintaining the dispersed state of the carbon. As a result, the carbon black, which exhibits a specific resistance of about 0.1 to 10 Ω·cm, is dispersed in an elastomer (1012 to 1016 Ω·cm, which can be said to be an insulator, to thereby form a medium resistance region having a resistance of 104 to 108 Ω·cm so as to be stable.

The surface layer 14*c* is formed, for example, by impregnating the surface layer portion of the elastic layer 14*b* with a surface treatment liquid. The surface treatment liquid is obtained by dissolving at least an isocyanate component in an organic solvent. An example of the organic solvent is methyl acetate, butyl acetate, pentyl acetate, or the like. When using such an organic solvent, for example, isocyanate compounds such as 2,4-tolylene diisocyanate (TDI) and 4,4-diphenylmethane diisocyanate (MDI), multimer or modified body of these, and the like can be used as isocyanate components contained in the surface treatment liquid.

The surface treatment liquid may contain a polyether-based polymer. The polyether-based polymer is preferably soluble in an organic solvent, and preferably has active hydrogen to be chemically bonded by reacting with the isocyanate compound. A suitable example of the polyether-based polymer having the active hydrogen includes polymer having hydroxyl group or allyl group, such as polyol, glycol, or the like to be used for isocyanate-terminated prepolymers.

In addition, the surface treatment liquid may contain a polymer selected from acrylic fluorine-based polymers and acrylic silicone-based polymers. The acrylic fluorine-based polymer and the acrylic silicone-based polymer are soluble in a predetermined solvent and can be chemically bonded to the isocyanate compound by reacting with the isocyanate compound. The acrylic fluorine-based polymer is, for example, a solvent-soluble fluorine-based polymer having a hydroxyl group, an alkyl group, or a carboxyl group. Examples thereof include block copolymer of acrylic acid ester and fluorinated alkyl acrylates, and derivatives thereof. In addition, the acrylic silicone-based polymer is a solvent-soluble silicone-based polymer. Examples thereof include block copolymer of acrylic acid ester and acrylic acid siloxane ester, and derivatives thereof.

Further, carbon black such as acetylene black or the like may be added to the surface treatment liquid as a conductivity imparting agent.

It may be preferable that the polyether-based polymer, acrylic fluorine-based polymer and acrylic silicone-based polymer in the surface treatment liquid are such that the total amount of the polyether-based polymer, acrylic fluorine-based polymer and acrylic silicone-based polymer is 10 to 70 (mass %) with respect to the isocyanate component. If it is less than 10 (mass %), the effect of retaining the carbon black or the like in the surface treatment liquid would be reduced. On the other hand, if it is more than 70 (mass %), there may be a problem that the electrical resistance value increases or the amount of the isocyanate component becomes relatively too small to form an effective surface treatment layer.

By immersing the elastic layer 14*b* in the surface treatment liquid described above to apply the surface treatment liquid to the elastic layer 14*b* and drying and curing the elastic layer 14*b*, the surface layer portion of the elastic layer 14*b* is impregnated with the surface treatment liquid and thus forms the surface layer 14*c*.

(Supply Roller)

Figure 5B:
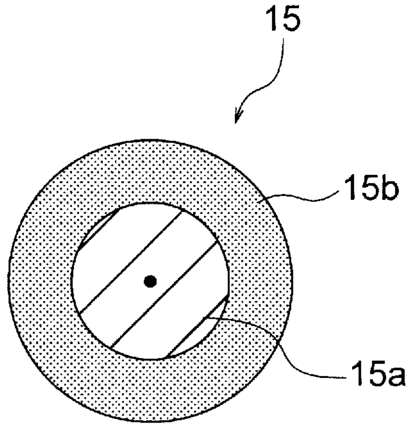

Next, the supply roller 15 is described. FIG. 5B is a diagram illustrating a cross-sectional structure of the supply roller 15. The supply roller 15 includes a conductive core metal 15*a* and a sponge-like foamed elastic layer 15*b* formed on the surface of the core metal 15*a*. The core metal 15*a* is made of, for example, metal such as iron, aluminum, or stainless steel, or the like.

Rubber composition to form the foamed elastic layer 15*b* contains rubber, a foaming agent, a conductivity-imparting agent, and, if necessary, additives. It may be preferable that the rubber is silicone rubber or silicone-modified rubber, which is excellent in heat resistance and chargeability. The foaming agent may be any foaming agent used for foamed rubber. Examples of inorganic foaming agents include sodium bicarbonate, ammonium carbonate, and the like. Examples of organic foaming agents include organic azo compounds, such as diazoamino derivatives, azonitrile derivatives, azodicarboxylic acid derivatives, and the like. In a case of forming continuous cells in the foamed elastic layer 15*b*, an inorganic foaming agent is used. In a case of forming close cells in the foamed elastic layer 15*b*, an organic foaming agent is used. The additives are, for example, fillers, colorants, release agents, and the like.

(Development Blade)

The development blade 16 illustrated in FIG. 2 is a plate-like member made of metal such as stainless steel or the like. The development blade 16 is bent at a contact portion thereof to be contact with the development roller 14. The development blade 16 regulates the thickness of the toner layer on the development roller 14 by being in contact with the surface of the development roller 14.

(Cleaning Blade)

The cleaning blade 17 illustrated in FIG. 2 is formed of a plate-like elastic body. The material of the plate-like elastic body is, for example, flexible rubber material or plastic. The cleaning blade 17 is in sliding contact with the surface of the photosensitive drum 11 to scrape and remove a residual toner (the toner that remains on the surface of the photosensitive drum 11 without being transferred to the conveyance belt 32).

(Control System of Image Formation Apparatus)

Next, a control system of the image formation apparatus 1 is described. FIG. 6 is a block diagram illustrating a view of the control system (control-related configuration) of the image formation apparatus 1. The image formation apparatus 1 includes a controller 100, a reception memory 121, an image data editing memory 122, an operation section 123, sensors 124, and a power supply circuit 110.

The controller 100 includes a print controller (main controller) 101, an I/F (interface) controller 102, a head controller 103, a fixation controller 104, a fixation drive controller 105, a conveyance controller 106, and a drive controller 107.

The print controller 101 is equipped with a microprocessor, a ROM (Read Only Memory), a RAM (Random Access Memory), input/output ports, a timer, and the like. The print controller 101 (print control unit) controls the overall operation of the image formation apparatus 1 by executing predetermined programs. Specifically, the print controller 101 receives print data and control commands from an external device via an interface controller (I/F controller) 102, and controls the head controller 103, the fixation controller 104, the fixation drive controller 105, and the conveyance controller 106, the drive controller 107, and the power supply circuit 110 comprehensively to execute a printing operation.

The IF controller 102 receives the print data and the control command from the external device such as a personal computer or the like, and transmits information about the state of the image formation apparatus 1 to the external device.

The reception memory 121 temporarily records print data inputted from the external device via the I/F controller 102.

The image data editing memory 122 receives the print data stored in the reception memory 121 and records image data obtained by editing the print data.

The operation section 123 includes a display unit or a display that displays information about the state of the image formation apparatus 1 and an input unit that receives an input or an operation from the user. The display unit is configured by, for example, an LED lamp, and the input section is configured by, for example, buttons or a touch panel.

The sensors 124 includes various sensors that monitor the operating state of the image formation apparatus 1. Specifically, the sensors 124 includes a position detection sensor that detects the position of the medium P in the conveyance path, a temperature/humidity sensor, a print density sensor, a toner remaining amount sensor, and the like.

The power supply circuit 110 includes the charging roller power supply 111 that applies the charging voltage to the charging roller 12, the development roller power supply 112 that applies the development voltage to the development roller 14, the supply roller power supply 113 that applies the supply voltage to the supply roller 15, the development blade power supply 114 that applies the blade voltage to the development blade 16, and the transfer roller power supply 115 that applies the transfer voltage to the transfer roller 31.

The head controller 103 controls light emission of each LED of the exposure head 21 based on the image data recorded in the image data editing memory 122.

The fixation controller 104 includes a temperature control circuit, and supplies electric current to the heater in the heat roller 51 based on the output signal of a temperature sensor such as a thermistor provided in the fixation device 50.

The fixation drive controller 105 controls rotation of a fixation motor 53 that drives the heat roller 51 to rotate. The discharge roller pairs 61 are driven to rotate by the fixation motor 53.

The conveyance controller 106 controls the rotation of the conveyance motor 45 that drives the hopping roller 42, the regist roller pair 43 and the conveyance roller pair 44. The rotation of the conveyance motor 45 is transmitted to the hopping roller 42, the regist rollers 43, and the conveyance rollers 44 via an electromagnetic clutch (not illustrated) or the like.

The drive controller 107 controls rotation of the drive motor 108 that is configured to drive the photosensitive drum 11 to rotate. The rotation of the photosensitive drum 11 is also transmitted via a gear train (not illustrated) to the development roller 14, the supply roller 15, and the drive roller 33.

(Printing Operation of Image Formation Apparatus)

Next, a printing operation of the image formation apparatus 1 is described with reference to FIGS. 1, 2, and 6. Upon receiving the print command and the print data from the external device via the I/F controller 102, the print controller 101 starts a print operation.

The print controller 101 drives the drive motors 108 corresponding to the respective image formation units 10 by the drive controller 107, thereby causing the photosensitive drums 11 to start rotating. The driving force of the drive motor 108 is also transmitted to and start to rotate the development roller 14, the supply roller 15 and the driving roller 33. The charging roller 12 also rotates following the rotation of the photosensitive drum 11.

The print controller 101 also applies, from the power supply circuit 110, a charging voltage to the charging roller 12, a developing voltage to the development roller 14, a supply voltage to the supply roller 15, and a blade voltage to the development blade 16.

As an example, a charging voltage of −888 V (voltage) is applied to the charging roller 12 to charge the surface of the photosensitive drum 11. The developing voltage of −10 V is applied to the development roller 14, the supply voltage of −340 V is applied to the supply roller 15, and the blade voltage of −340 V is applied to the development blade 16.

The print controller 101 also transmits image data for each page to the head controller 103. Based on the image data, the head controller 103 causes the LEDs of the exposure head 21 to emit light to expose the photosensitive drum 11. This causes the absolute value of the potential of the exposed portions of the photosensitive drum 11 to be lowered, thereby forming an electrostatic latent image on the photosensitive drum 11.

As illustrated in FIG. 2, the toner contained in the toner storage 22 of the development unit 20 is adhered to the development roller 14 due to the magnetic field generated by the potential difference between the supply roller 15 and the development roller 14.

The development blade 16 causes the toner on the development roller 14 to be a toner layer of a constant thickness. Due to the magnetic field generated by the potential difference between the latent image (exposed portions) on the photosensitive drum 11 and the toner on the development roller 14, the toner on the development roller 14 is adhered to the latent image on the photosensitive drum 11. Thereby, a toner image (developer image) is formed on the surface of the photosensitive drum 11.

Substantially simultaneously with the start of image formation in the image formation unit 10, the conveyance controller 106 starts to drive the conveyance motor 45. With this, the hopping roller 42 feeds the medium P from the medium tray 41, the regist roller pair 43 conveys the fed medium P along the conveyance path, and the conveyance roller pair 44 conveys the medium P to the transfer unit 30.

In the transfer unit 30, the conveying belt 32, which runs as the drive roller 33 rotates, attracts and holds the medium P thereon to convey the medium P. The medium P electrostatically attracted onto the conveyance belt 32 is conveyed to the transfer nip between the photosensitive drum 11 and the transfer roller 31 of each image formation unit 10.

In accordance with the timing when the leading edge of the medium P reaches the transfer nip between the photosensitive drum 11 and the transfer roller 31, the transfer voltage is applied to the transfer roller 31 from the transfer roller power supply 115.

The transfer voltage of +3000 V is supplied to the transfer roller 31. Due to the potential difference between the toner image developed on the photosensitive drum 11 and the transfer roller 31, the toner image is transferred from the photosensitive drum 11 to the medium P on the conveyance belt 32.

Residual toner remaining on the surface of the photosensitive drum 11 after the transfer of the toner image is scraped off by the cleaning blade 17 and discharged by a waste toner transport member.

In this way, the toner images of the respective colors formed by the photosensitive drums 11 of the image formation units 10K, 10C, 10M, and 10Y are sequentially transferred and thus superposed onto the medium P. The medium P onto which the toner images of the respective colors have been transferred is further conveyed by the conveyance belt 32 toward the fixation device 50.

Residual toner remaining on the surface of the conveying belt 32 is removed by the belt cleaning member 35 and then stored in the waste toner storage 36.

In the fixation device 50, the heat roller 51 is heated to the fixing temperature by the fixation controller 104 and rotated by the fixation motor 53. After reaching the fixation device 50, the medium P is heated and pressed between the heat roller 51 and the pressure roller 52 so that the toner image on the medium P is fixed to the medium P. The medium P having the toner image fixed thereon is discharged from the discharge port 62 by the discharge rollers 61 of the media discharge unit 60 and thus stacked on the stacker 63. This completes the printing operation.

(Evaluation Method)

Twelve types of charging rollers 12 of Examples 1-1 to 1-5 and Comparative Examples 1-1 to 1-7 are produced as described later in detail. A storability, a fog, a surface area ratio of convex portions, and a maximum height of the convex portions of each charging roller 12 are evaluated. Each evaluation method is described below.

(Storability)

First, the evaluation of the storability of the charging roller 12 is described. If the photosensitive drum 11 and the charging roller 12 are left in the nipped state for a long time, a component(s) of the elastic layer 12*b* of the charging roller 12 may exude out to be adhered to the photosensitive drum 11. In this case, the printed image may have streaks at intervals corresponding to the circumferential length of the photosensitive drum 11. In the storage stability evaluation, the occurrence of streaks is evaluated as follows.

First, the image formation unit 10M (magenta) in which the photosensitive drum 11 and the charging roller 12 form the nip therebetween is stored (left) for 6 days under an environment of the temperature of 50° C. and the relative humidity of 90%. The reason why such a high temperature and high humidity environment is set is to facilitate the state change of the charging roller 12 under the condition that the nip pressure is applied.

After storing for 6 days, the image formation unit 10M is attached to the image formation apparatus 1 (LED printer "C844dnw" manufactured by Oki Electric Industry Co., Ltd.), and a printing test is performed. As the medium P, A4 size plain paper ("Excellent White" manufactured by Oki Electric Industry Co., Ltd.) is used.

The printing test is carried out on two sets of 10 sheets each including three sheets of a 2-by-2 pattern (halftone), three sheets of a 1-by-1 pattern, three sheets of a solid pattern, and one sheet of a blank pattern. Note that in the 2-by-2 pattern (halftone pattern), four squares (four dots) composed of two dots in the vertical direction by two dots in the horizontal direction are formed in each set of sixteen squares (sixteen dots) composed of four dots in the vertical direction by four dots in the horizontal direction.

After that, the 2-by-2 pattern of the first set is visually observed, and the presence or absence of streaks in the cycle of the photosensitive drum 11 (outer diameter: 30 mm) is determined. As a result of the visual observation, when the streaks are observed, the storage stability is evaluated as "poor". If no streaks are observed, the storage stability is evaluated as "good".

(Surface Area Ratio of Convex Portions)

Next, a surface area ratio of the convex portions of the charging roller 12 is described. The surface of the charging roller 12 is observed using a confocal microscope "Hybrid Laser Microscope" manufactured by Lasertec Co., Ltd. The magnification of the confocal microscope is 20 times, and a lamp is used as a light source. A luminance image is obtained by converting the observed image by the confocal microscope into brightness.

Figure 7A:
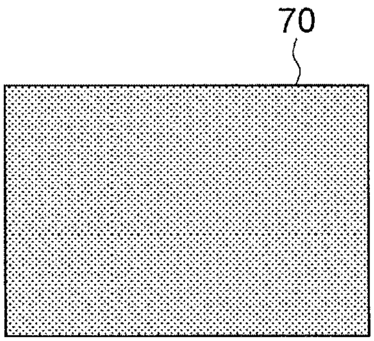
FIG. 7A is a diagram conceptually illustrating a luminance image of a surface of a charging roller according to a first embodiment and FIG. 7B is a diagram conceptually illustrating a binarized image thereof.

FIG. 7A is a diagram conceptually illustrating a luminance image 70 on the surface of the charging roller 12. It can be considered that the higher the brightness in the luminance image 70, the larger the protrusion from the surface of the charging roller 12.

Figure 7B:
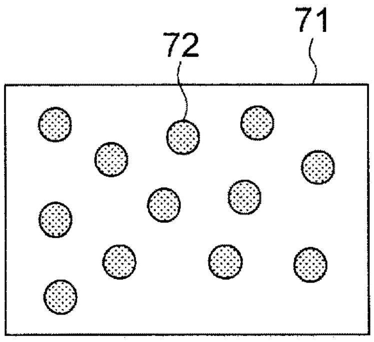

Next, the luminance image 70 of the surface of the charging roller 12 is binarized. The image analysis software "Image-J" is used for the binarization processing. Assuming that the lower limit and the upper limit of the luminance in the effective area of the luminance image 70 are 0 and 255, respectively, a threshold value for the binarization process is set to 120. FIG. 7B is a diagram conceptually illustrating a binarized image 71. As illustrated in FIG. 7B, the colored portions (the portions whose brightness is equal to or higher than the threshold value) in the binarized image 71 can be determined as the convex portions 72 protruding from the surface of the charging roller 12.

In the binarized image 71, the total area of the convex portions 72 (the portions whose brightness is equal to or higher than the threshold value) is calculated. Then, the calculated sum of the areas of the convex portions 72 is divided by the entire area of the binarized image 71 so as to obtain a surface area ratio A of the convex portions.

(Maximum Height of Convex Portions)

Figure 8A:
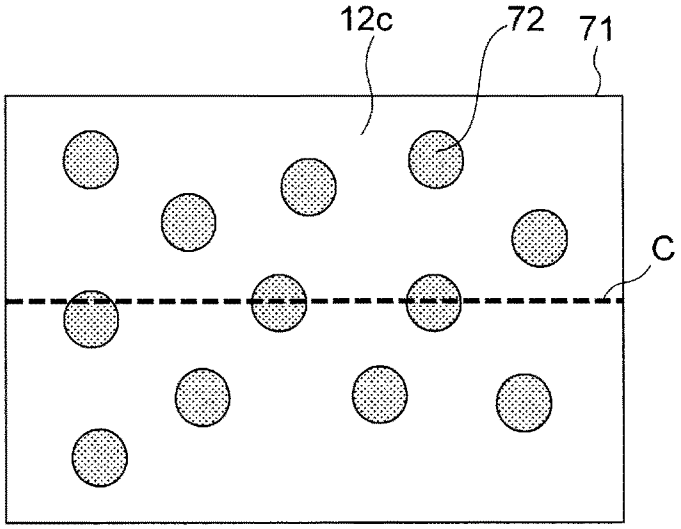
FIG. 8A is a diagram conceptually illustrating the binarized image of the surface of the charging roller according to a first embodiment.

Next, the maximum height of the convex portions (projections, bumps, asperities) of the charging roller 12 is described. FIG. 8A is the binarized image 71 of the surface of the charging roller 12 described above. A straight line C is a straight line parallel to the axial direction of the charging roller 12 and passing through the center in the circumferential direction of the binarized processed image 71. This straight line C indicates a portion of the surface of the charging roller 12 that is closest to the confocal microscope.

Figure 8B:
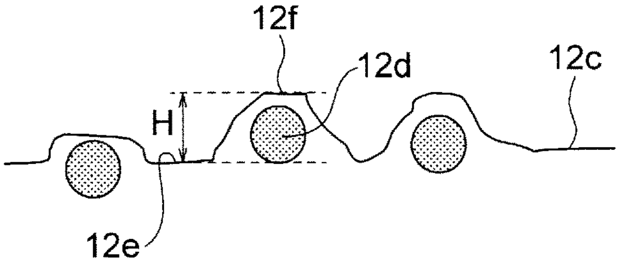
FIGS. 8B and 8C are diagrams conceptually illustrating cross sections obtained by analyzing the luminance image.

By analyzing the luminance data of the luminance image 70 (FIG. 7A) before the binarization process, the height (μm) from the surface of the charging roller 12 can be calculated for each point on the center line C. FIG. 8B conceptually illustrates the height distribution along the center line C.

As illustrated in FIG. 8B, the convex portions of the charging roller 12 are portions of the surface layer 12*c* containing porous particles 12*d*. The porous particles 12*d* are porous urethane particles, for example, and are covered with the urethane-based polymer of the surface layer 12*c*. In FIG. 8B, one convex portion contains one porous particle 12*d*, but one convex portion may contain a plurality of porous particles 12*d* (see FIGS. 11A and 11B).

In the height distribution illustrated in FIG. 8B, a difference between the lowest portion 12*e* and the highest portion 12*f* is defined to be a maximum height H (μm) of the convex portions 72. The higher the maximum height H of the convex portions 72, the longer the distance from the elastic layer 12*b* to the photosensitive drum 11.

Figure 8C:
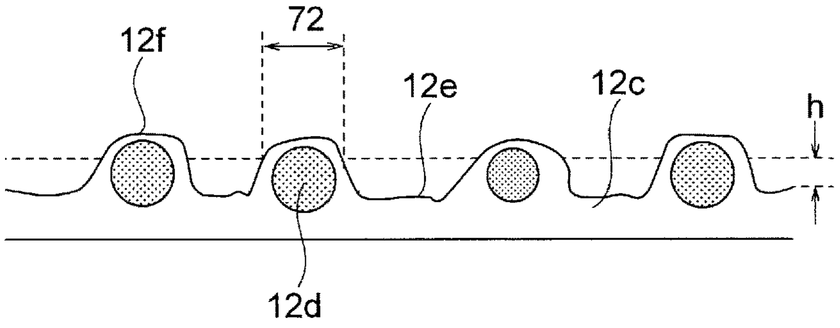

FIG. 8C is a diagram for explaining a relationship between the convex portions 72 of the surface layer 12*c* of the charging roller 12 and the threshold value in the binarization process. In FIG. 8C, "h" indicates the height corresponding to the threshold value in the binarization process. That is, the portions of the surface layer 12*c* that is equal to or greater than the height h is determined as the convex portions 72 in the binarized image.

Here, 120 is used as the threshold with respect to the upper limit (0) and lower limit (255) of the brightness in the luminance image (FIG. 7A). Therefore, the height "h" corresponding to the threshold is approximately half the maximum height H (FIG. 8B) ($h \approx H/2$). However, the threshold value for the binarization process is not limited to 120. Any threshold value may be used as long as the convex portions formed by the porous particles 12*d* can be clearly determined.

(Fog)

Next, evaluation of fog is described. Depending on printing conditions or environmental conditions, toner charged to the opposite polarity (reversely charged toner) or toner having a low chargeability (low charged toner) may occur. These toners are adhered to the non-exposed areas on the photosensitive drum 11 and are scattered and transferred to the white background of the medium P. Such a phenomenon is called fog, and the toner that causes the fog is called fog toner. In particular, when a highly smooth medium P such as waterproof paper is used, the fog is easily visible.

As the variation in the surface potential of the photosensitive drum 11 increases, a locally-high surface potential portion tends to occur, to which the reversely charged toner may be adhered, which causes the occurrence of fog to become conspicuous. On the other hand, as the variation in the surface potential of the photosensitive drum 11 decreases, a locally-high surface potential portion is less likely to occur, which suppresses the occurrence of fog.

For measuring fogging, first, the image formation unit 10M (magenta) in which the photosensitive drum 11 and the charging roller 12 form the nip therebetween is stored (left) for 2 days under the environment of the temperature of 28° C. and the relative humidity of 80%. After the storage, the image formation unit 10M is installed to the image formation apparatus 1 (LED printer "C844dnw" manufactured by Oki Electric Industry Co., Ltd.).

Figure 9A:
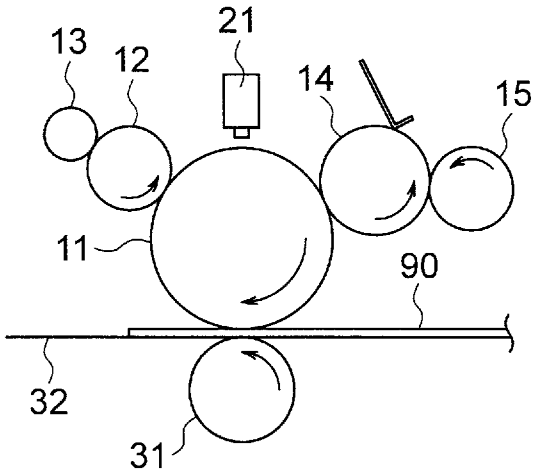
FIGS. 9A to 9C are schematic diagrams for explaining a method of measuring fog according to a first embodiment.
Figure 9B:
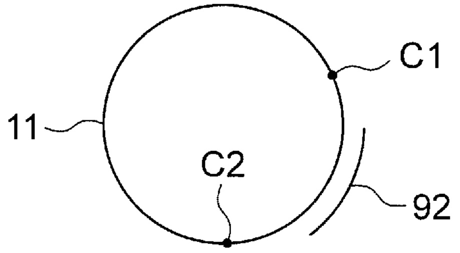
Figure 9C:
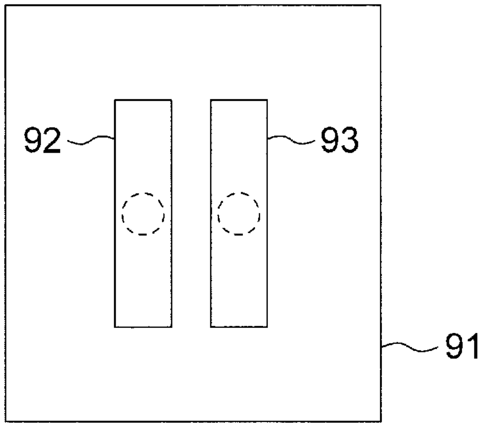

FIGS. 9A to 9C are schematic diagrams for explaining the method of measuring fog. Using the image formation apparatus 1 (LED printer "C844dnw" manufactured by Oki Electric Industry Co., Ltd.) described above, printing is performed on A4 size plain paper ("Excellent White" manufactured by Oki Electric Industry Co., Ltd.) as the medium 90. As illustrated in FIG. 9A, a pattern having the duty ratio of 0% (blank paper pattern) is printed on the entire surface of the medium 90 by using the magenta image formation unit 10M.

The charging voltage is set to −888 V, the developing voltage is set to −210 V, and both the supply voltage and the blade voltage are set to −340 V. In this case, the surface voltage of the photosensitive drum 11 is −350 V. The printing environment is set at the temperature of 28° C. and the relative humidity of 80%.

The image formation apparatus 1 is stopped during the printing operation, and the image formation unit 10M is removed from the image formation apparatus 1. Then, as illustrated in FIG. 9B, an adhesive tape 92 ("Scotch Mending Tape" manufactured by Sumitomo 3M Co., Ltd.) is attached to the surface of the photosensitive drum 11 and then peeled off to collect the toner (fog toner) that is adhered to the surface of the photosensitive drum 11.

Note that the position where the tape 92 is attached to the surface of the photosensitive drum 11 extends from the contact position C1 (development position) between the photosensitive drum 11 and the development roller 14 to the contact position C2 (transfer position) between the photosensitive drum 11 and the transfer roller 31.

The tape 92 (hereinafter referred to as a sampling tape) is adhered to a sheet 91 ("Excellent White" manufactured by Oki Electric Industry Co., Ltd.), which is A3 size plain paper, illustrated in FIG. 9C. Also, a tape 93 (hereinafter referred to as a comparison tape) serving as a reference for comparison is attached to the same sheet 91.

Then, with a spectrophotometer ("CM-2600d" manufactured by Konica Minolta Co., Ltd., measurement diameter: 8 mm), a hue difference ΔE (L*a*b color system chromaticity) between the sampling tape 92 and the comparison tape 93 is obtained based on the following formula (1).

Here, the hue difference ΔE is expressed as a relative value based on Comparative Example 1-2, which is described later. When the relative value of the hue difference ΔE is 1.0 or less, the fog is evaluated as good (wight circle). On the other hand, when the relative value of the hue difference ΔE is greater than 1.0, the fog is evaluated as poor (X: cross mark).

EXAMPLES AND COMPARATIVE EXAMPLES

Twelve types of charging rollers 12 are produced as Examples 1-1 to 1-5 and Comparative Examples 1-1 to 1-7. The core metal 12*a* of the charging roller 12 (see FIG. 3) is made of free-cutting steel (SUM) plated with electroless nickel. The elastic layer 12*b* is formed of a rubber that contains epichlorohydrin rubber (ECO) as a main component thereof. The outer diameter of the core metal 12*a* is set to 8 mm, and the outer diameter of the elastic layer 12*b* is set to 12 mm.

Comparative Example 1-1

The charging roller 12 of Comparative Example 1-1 is produced as follows. First, an elastic layer 12*b* is formed on a surface of a core metal 12*a*, and a surface of the elastic layer 12*b* is dry-polished using a whetstone by a cylindrical polishing method, and then wet-polished using a tape. Thereafter, a solution is prepared by mixing hexamethylene diisocyanate (HDI) with ethyl acetate (solvent), and this solution is applied to the surface of the elastic layer 12*b* to evaporate the solvent.

Comparative Example 1-2

The charging roller 12 of Comparative Example 1-2 is produced as follows. First, an elastic layer 12*b* is formed on a surface of a core metal 12*a*. A solution is prepared by mixing a polyamide (nylon) polymer and non-porous nylon particles in a water/alcohol mixed solvent, and this solution is applied to a surface of the elastic layer 12*b* to evaporate the solvent. As the nylon particles, those containing nylon particles having a volume average particle diameter of 30 μm and nylon particles having a volume average particle diameter of 20 μm are used.

Comparative Example 1-3

The charging roller 12 of Comparative Example 1-3 is produced as follows. First, an elastic layer 12*b* is formed on a surface of a core metal 12*a*, and a surface of the elastic layer 12*b* is dry-polished using a whetstone by a cylindrical polishing method, and then wet-polished using a tape. Thereafter, a solution is prepared by mixing a urethane-based polymer and non-porous urethane particles in ethyl acetate (solvent), and this solution is applied to the surface of the elastic layer 12*b* to evaporate the solvent. As the urethane particles, urethane particles having a volume average particle size of 20 μm are used.

Example 1-1

The charging roller 12 of Example 1-1 is produced as follows. First, an elastic layer 12*b* is formed on a surface of a core metal 12*a*, and a surface of the elastic layer 12*b* is dry-polished using a whetstone by a cylindrical polishing method. Thereafter, a solution is prepared by mixing a urethane-based polymer and porous urethane particles in ethyl acetate (solvent), and this solution is applied to the surface of the elastic layer 12*b* to evaporate the solvent.

Note that the urethane particles refer to particles containing urethane as a main component thereof. More specifically, the urethan particles refer to particles in which 50 (wt %) or more of the particles are urethane. The porous means having pores on surfaces of the particles. In this example, porous urethane particles having a volume average particle size of 10±0.2 μm (that is, 9.8 μm to 10.2 μm) are used.

Example 1-2

The charging roller 12 of Example 1-2 is produced in the same manner as in Example 1-1 except for the amount of porous urethane particles. The amount of the porous urethane particles in Example 1-2 is 0.7 times the amount of the porous urethane particles in Example 1-1.

Example 1-3

The charging roller 12 of Example 1-3 is produced in the same manner as in Example 1-1 except for the amount of porous urethane particles. The amount of the porous urethane particles in Example 1-3 is 0.5 times the amount of the porous urethane particles in Example 1-1.

Example 1-4

The charging roller 12 of Example 1-4 is produced in the same manner as in Example 1-1 except for the amount of porous urethane particles. The amount of the urethane particles in Example 1-4 is 1.2 times the amount of the porous urethane particles in Example 1-1.

Example 1-5

The charging roller 12 of Example 1-5 is produced in the same manner as in Example 1-1 except for the amount of the cross-linking agent of the urethane-based polymer. The amount of the cross-linking agent in Example 1-5 is 0.5 times the amount of the cross-linking agent in Example 1-1.

Comparative Example 1-4

The charging roller 12 of Comparative Example 1-4 is produced in the same manner as in Example 1-1 except for the amount of the porous urethane particles. The amount of the porous urethane particles in Comparative Example 1-4 is 0.3 times the amount of the porous urethane particles in Example 1-1.

Comparative Example 1-5

The charging roller 12 of Comparative Example 1-5 is produced as follows. First, an elastic layer 12*b* is formed on a surface of a core metal 12*a*, and a surface of the elastic layer 12*b* is dry-polished using a whetstone by a cylindrical polishing method. Thereafter, a solution is prepared by mixing a urethane-based polymer in ethyl acetate (solvent), and this solution is applied to the surface of the elastic layer 12*b* to evaporate the solvent.

Comparative Example 1-6

The charging roller 12 of Comparative Example 1-6 is produced in the same manner as in Comparative Example 1-5 except for the amount of the electronic conductive agent of the urethane-based polymer. The amount of the electronic conductive agent in Comparative Example 1-6 is 0.5 times the amount of the electronic conductive agent in Comparative Example 1-5.

Comparative Example 1-7

The charging roller 12 of Comparative Example 1-7 is produced in the same manner as in Comparative Example 1-5 except for the amount of the cross-linking agent of the urethane-based polymer. The amount of the cross-linking agent in Comparative Example 1-7 is 0.5 times the amount of the cross-linking agent in Comparative Example 1-5.

(Evaluation Results)

For each of the charging rollers 12 of Examples 1-1 to 1-5 and Comparative Examples 1-1 to 1-7 produced as described above, the surface area ratio A (%) of the convex portions and the maximum height H (μm) of the convex portions is determined, the storage stability (presence or absence of streaks in the cycle of the photosensitive drum) is evaluated, and a hue difference ΔE representing fog is determined. The results is illustrated in Table 1.

TABLE 1

| Examples/ Comparative Examples | Particles in surface layer | Ratio A (%) of convex portions to surface area | Maximum height H (μm) of convex portions | Storage stability | Fog Hue difference ΔE (relative value) | others |
|---|---|---|---|---|---|---|
| Comparative Example 1-1 | no particles | 93.6 | 12.4 | good | 1.67 | — |
| Comparative Example 1-2 | nylon particles | 23.1 | 11.9 | good | 1.00 | black spot |
| Comparative Example 1-3 | urethane particles | 62.0 | 12.9 | poor | 1.13 | — |
| Comparative Example 1-4 | porous urethane particles | 17.2 | 9.4 | poor | 0.69 | — |
| Example 1-1 | porous urethane particles | 90.9 | 34.7 | good | 0.98 | — |
| Example 1-2 | porous urethane particles | 88.4 | 27.5 | good | 0.87 | — |
| Example 1-3 | porous urethane particles | 68.4 | 14.3 | good | 0.72 | — |
| Example 1-4 | porous urethane particles | 95.8 | 40.0 | good | 1.19 | — |
| Example 1-5 | porous urethane particles | 84.1 | 23.0 | good | 0.74 | — |
| Comparative Example 1-5 | no particles | 5.0 | 0.8 | poor | 0.81 | — |
| Comparative Example 1-6 | no particles | 0.0 | 0.9 | poor | — | — |
| Comparative Example 1-7 | no particles | 0.0 | 1.6 | poor | — | — |

Figure 10:
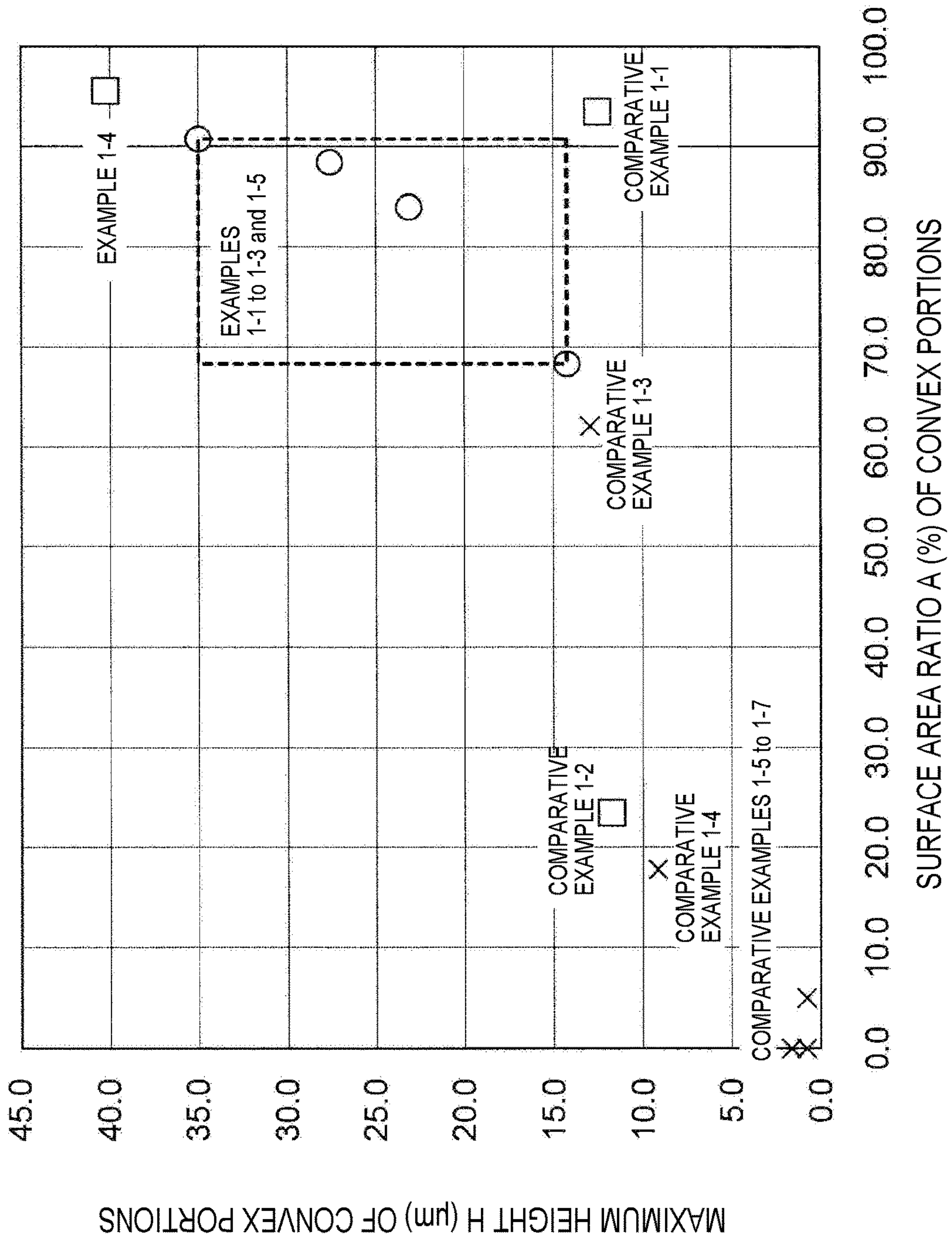
FIG. 10 is a graph illustrating a relationship between a surface area ratio of convex portions, a maximum height of the convex portions of the charging rollers, and an occurrence of fog of Examples 1-1 to 1-5 and Comparative Examples 1-1 to 1-7.

FIG. 10 is a graphical representation of the results of Table 1. The horizontal axis of FIG. 10 indicates the surface area ratio A (%) of the convex portions, and the vertical axis indicates the maximum height H μm of the convex portions. In addition, in FIG. 10, the white circles indicate the evaluation result of the storage stability is good (no streaks are observed), and the cross marks (X) indicate the evaluation result of the storage stability is poor or unsatisfactory (streaks are observed). In addition, the white squires indicate that the evaluation result of the storage stability is good but the evaluation result of the fog or other factors is poor or unsatisfactory.

The evaluation results on the storage stability are considered as follows. As illustrated in Table 1 and FIG. 10, in Examples 1-1 to 1-5, the streaks are not observed and the storage stability is evaluated as good. On the other hand, in Comparative Examples 1-3 to 1-7, the streaks are observed and the storage stability is evaluated as poor.

When the charging roller 12 and the photosensitive drum 11 forming the nip therebetween are left for a long period of time, a component (more specifically, oligomer) of the elastic layer 12*b* of the charging roller 12 exudes out onto the surface of the charging roller 12 and is adhered to the surface of the photosensitive drum 11, which may appear as streaks on the printed image.

In each of the charging rollers 12 of Examples 1-1 to 1-5, since the surface layer 12*c* covering the elastic layer 12*b* includes the porous particles 12*d*, the component that exudes out from the elastic layer 12*b* is absorbed in pores on the surface of the porous particles 12*d* of the surface layer 12*c*. As a result, it may be considered that, even after being left for a long period of time, the component exuded from the elastic layer 12*b* do not adhere to the surface of the photosensitive drum 11, which could suppress the occurrence of streaks.

Figure 11A:
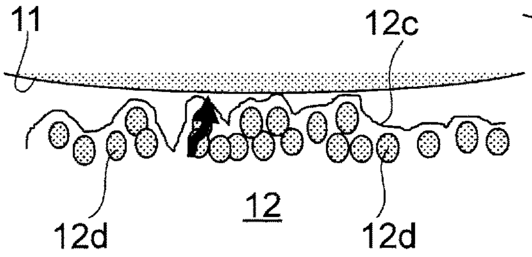
FIGS. 11A and 11B are diagrams conceptually illustrating cross sections in the vicinity of the surface of the charging roller.
Figure 11B:
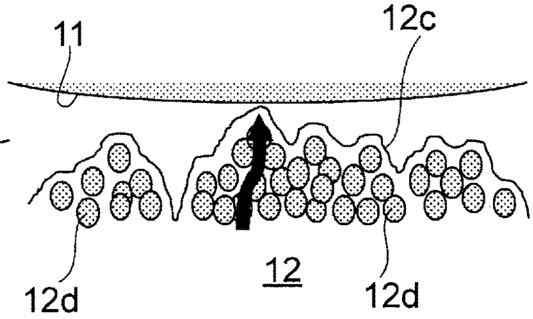

FIGS. 11A and 11B are conceptual diagrams for explaining the difference in the maximum height H of the convex portions. As illustrated in FIG. 11A, the lower the maximum height H of the convex portions, the shorter the route for the component exuded from the elastic layer 12*b* to reach the photosensitive drum 11. As illustrated in FIG. 11B, the higher the maximum height H of the convex portions, the longer the path for the component exuded from the elastic layer 12*b* to reach the photosensitive drum 11.

In Examples 1-1 to 1-5, the surface layer 12*c* of the charging roller 12 includes the porous particles 12*d*, the surface area ratio A of the convex portions is as large as 68.4% or more, and the maximum height H is 14.3 μm or more. Therefore, it is considered that the occurrence of streaks could be suppressed particularly effectively.

In Comparative Example 1-4, although the surface layer 12*c* includes the porous particles 12*d*, the surface area ratio A of the convex portions is as small as 17.2%, and the maximum height H of the convex is as low as 9.4 μm. Since the amount of the porous particles 12*d* covering the elastic layer 12*b* is small and the height H of the protrusions is small, it is considered that the component exuded from the elastic layer 12*b* easily reach the photosensitive drum 11, resulting in the generation of streaks.

The evaluation results on fog are considered as follows. In each of Examples 1-1 to 1-3 and 1-5, the relative value of the hue difference ΔE is 1.0 or less, and fog is not observed. On the other hand, in Comparative Example 1-1, the relative value of the hue difference ΔE is greater than 1.0, and fog is observed.

In Comparative Example 1-2, no fog is observed, but black spots are observed due to adhesion of the adhesive of the cleaning roller 13 to the charging roller 12. In Example 1-4, the relative value of the hue difference ΔE is greater than 1.0, and fog is observed.

Figure 12:
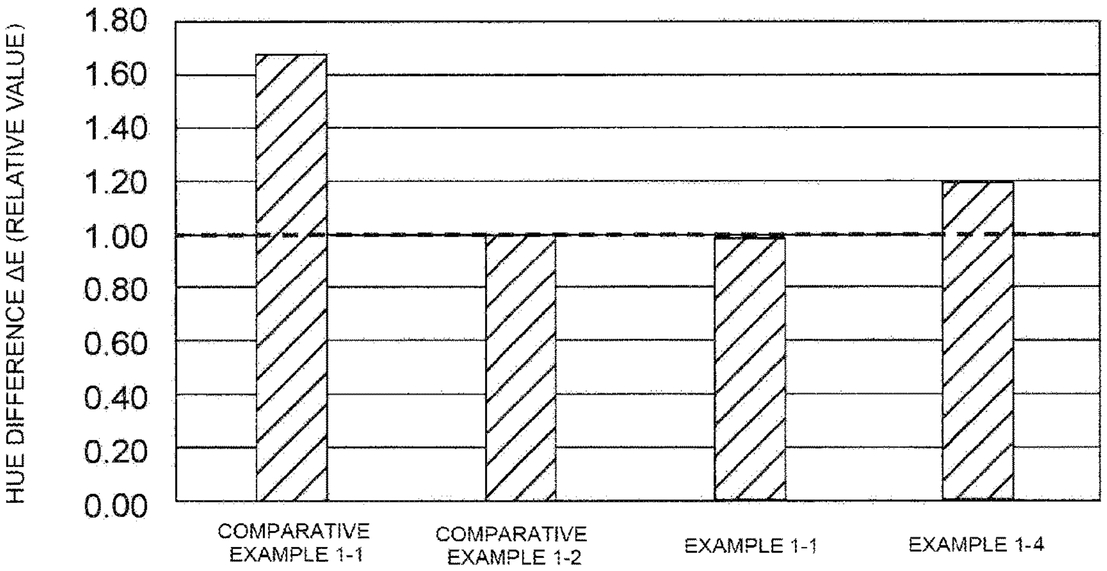
FIG. 12 is a graph illustrating a hue difference ΔE of each of Comparative Examples 1-1 and 1-2 and Examples 1-1 and 1-4.

FIG. 12 graphically illustrates the hue differences ΔE of Comparative Examples 1-1 and 1-2 and Examples 1-1 and 1-4. As described above, the value of the hue difference ΔE is expressed as a relative value with reference to Comparative Example 1-2. In Comparative Example 1-1 and Example 1-4, the relative value of the hue difference ΔE is greater than 1.0, and fog is observed.

If the surface of the charging roller 12 includes a locally high-potential portion(s), reversely charged toner or low-charged toner adheres to the locally high-potential portion (s), causing fog. In the charging rollers 12 of Examples 1-1 to 1-3 and 1-5, the surface layer 12*c* includes the porous particles 12*d*. Accordingly, it is considered that the discharge at the pores of the porous particles 12*d* stabilizes the surface potential of the charging roller 12, thereby suppressing the occurrence of fogging.

In the charging roller 12 of Example 1-4, although the surface layer 12*c* includes the porous particles 12*d*, the surface area of the convex portions is as large as 95.8%, and the maximum height of the convex portions is as high as 40.0 μm. In this case, it is conceivable that the component of the elastic layer 12*b* is less likely to reach the photosensitive drum 11, so the occurrence of streaks is suppressed.

Summarizing the above results, if the surface layer 12*c* of the charging roller 12 includes the porous particles 12*d* and the surface area ratio A of the convex portions is 68.4% or more (Examples 1-1 to 1-5), the occurrence of streaks due to exudation of the component of the elastic layer 12*b* can be suppressed, and the storage stability can be improved.

Furthermore, if the surface area ratio of the convex portions is 68.4% or more and 90.9% or less (Examples 1-1 to 1-3 and Example 1-5), the storage stability is improved and the occurrence of fog can be also suppressed.

Further, if the maximum height of the convex portions is 14.3 μm or more and 34.7 μm or less (Examples 1-1 to 1-3 and Example 1-5), the storage stability is improved and the occurrence of fog is suppressed.

Here, the porous particles 12*d* of the surface layer 12*c* of the charging roller 12 are the porous urethane particles (that is, porous particles containing urethane as a main component). An advantage of using urethane as a main component is that, for example, even when pressed against the photosensitive drum 11 for a long time, plastic deformation is unlikely to occur.

However, the porous particles 12*d* of the surface layer 12*c* of the charging roller 12 are not limited to the porous urethane particles and may be other porous particles. Whether the particles are porous particles or not can be determined, for example, by scraping off the surface layer 12*c* from the charging roller 12, dissolving the scraped material such as the urethane-based polymer or the like in a solvent, and then observing surfaces of residual particles with an optical microscope.

Further, as the polymer forming the surface layer 12*c* of the charging roller 12, the urethane-based polymer is used. As an advantage of using the urethane-based polymer, for example, plastic deformation is less likely to occur even when the photosensitive drum 11 is pressed against the photosensitive drum 11 for a long period of time. However, a polymer(s) other than urethane-based polymers may be used.

Note that it may be preferable that the main component of the surface layer 12*c* is the same as that of the porous particles 12*d* (urethane in an embodiment). This can prevent the component that exudes out from the elastic layer 12*b* from remaining at the interface between the surface layer 12*c* and the porous particles 12*d*, so as to absorb the component that exudes out into the numerous pores on the surface of the porous particles 12*d*.

The charging device 3 includes at least the charging roller 12 and a contact member that contacts the charging roller 12. The contact member is the photosensitive drum 11 in an above-described example, but may be the cleaning roller 13.

Effects of First Embodiment

As described above, the charging device 3 according to a first embodiment includes the charging roller (charging member) 12 which is rotatable and provided to be contactable with the photosensitive drum (contact member) 11. The charging roller 12 includes the core metal (the shaft) 12*a*, the elastic layer 12*b*, and the surface layer 12*c* containing the porous particles 12*d*. The ratio of the areas of the convex portions formed by the porous particles 12*d* with respect to the surface area of the surface layer 12*c* (that is, the surface area ratio A of the convex portions) is 68.4% or more. Therefore, it is possible to suppress the occurrence of streaks due to exudation of the component(s) of the elastic layer 12*b*, and improve the storage stability of the charging roller 12.

In particular, since the ratio of the areas of the convex portions formed by the porous particles 12*d* with respect to the surface area of the surface layer 12*c* (that is, the surface area ratio A of the convex portions) is 68.4% to 90.9%, the storage stability of the charging roller 12 can be improved and the surface potential of the charging roller 12 can be further stabilized so as to suppress the occurrence of fog.

Further, since the maximum height of the convex portions of the surface layer 12*c* is in the range from 14.3 μm to 34.7 μm, the storage stability of the charging roller 12 can be improved and the occurrence of fogging can be suppressed more effectively.

Second Embodiment

Next, a second embodiment is described. In a second embodiment, similar to or the same as in a first embodiment, the surface area ratio A of the convex portions of the surface layer 12*c* of the charging roller 12 is 68.4% or more (preferably within a range from 68.4% to 90.9%), and the maximum height H of the convex portions is within the range from 14.3 μm to 34.7 μm, so as to further suppress fog.

(Fog)

First, evaluation of fog is described below. Prior to measuring fogging, the image formation unit 10M (magenta) in which the photosensitive drum 11 and the charging roller 12 form the nip therebetween is stored (left) for 2 days under the environment of the temperature of 28° C. and the relative humidity of 80%. After the storage, the image formation unit 10M is installed to the image formation apparatus 1 (LED printer "C844dnw" manufactured by Oki Electric Industry Co., Ltd.).

After that, using the image formation apparatus 1 (LED printer "C844dnw" manufactured by Oki Electric Industry Co., Ltd.) incorporating the image formation unit 10M, 2,000 sheets of the media 90 are printed in each of which the pattern of the duty ratio of 0% (blank paper pattern) is printed under the environment of the temperature of 28° C. and the relative humidity of 80%.

In the printing test, a pattern having a duty ratio of 0% (a blank paper pattern) is printed to A4 size waterproof paper ("Lamifree" manufactured by Nakagawa Seisakusho Co., Ltd.) by the magenta image formation unit 10M. The charging voltage is set to −888 V, the developing voltage is set to −210 V, and both the supply voltage and the blade voltage are set to −340 V. The printing environment is set at the temperature of 28° C. and the relative humidity of 80%.

The image formation apparatus 1 is stopped during the printing operation, and the image formation unit 10M is removed from the image formation apparatus 1. Then, as described in a first embodiment with reference to FIGS. 9A to 9C, an adhesive tape 92 ("Scotch Mending Tape" manufactured by Sumitomo 3M Co., Ltd.) is attached to the surface of the photosensitive drum 11 and then peeled off to collect the toner (fog toner) that is adhered to the surface of the photosensitive drum 11.

The tape 92 (hereinafter referred to as sampling tape) is attached to a sheet 91 ("Excellent White" manufactured by Oki Electric Industry Co., Ltd.), which is A3 size plain paper, and a tape 93 (hereinafter referred to as comparison tape) that serves as a reference for comparison is attached to the same sheet 91.

Then, with a spectrophotometer ("CM-2600d" manufactured by Konica Minolta Co., Ltd.), a hue difference ΔE (L*a*b color system chromaticity) between the sampling tape 92 and the comparison tape 93 is obtained based on the above described formula (1).

In a second embodiment, when the hue difference ΔE is 1.6 or less, the evaluation of fog is judged to be good. When the hue difference ΔE is larger than 1.6, the evaluation of fog is judged to be poor.

In a first embodiment, the hue difference ΔE is expressed as a relative value, but in a second embodiment, the hue difference ΔE is expressed not as a relative value but as an actual value.

(Streaks)

Next, evaluation of streaks is described. After the image formation unit 10M (magenta) is stored (left) for 6 days under the environment of the temperature of 28° C. and the relative humidity of 90% as described above, the image formation unit 10M is installed to the image formation apparatus 1 (LED printer "C844dnw" manufactured by Oki Electric Industry Co., Ltd.) and a printing test is performed.

In the printing test, A4 size plain paper ("Excellent White" manufactured by Oki Electric Industry Co., Ltd.) is used. The printing test is carried out by the magenta image formation unit 10M on two sets of 10 sheets each including three sheets of a 2-by-2 pattern (halftone), three sheets of a 1-by-1 pattern, three sheets of a solid pattern, and one sheet of a blank pattern.

Note that the 2-by-2 pattern (halftone pattern) is to form four squares (four dots) composed of two dots in the vertical direction by two dots in the horizontal direction in each set of sixteen squares (sixteen dots) composed of four dots in the vertical direction by four dots in the horizontal direction. The 1-by-1 pattern is to form one dot in one square in each set of four squares composed of two dots in the vertical direction by two dots in the horizontal direction.

The printed first set of the 2-by-2 pattern is visually observed to determine the presence or absence of streaks. In particular, presence or absence is determined of streaks appearing at the same interval as the circumferential length of the photosensitive drum 11 (the outer diameter of 30 mm) (hereinafter referred to as "streaks in a drum cycle") and presence or absence is determined of streaks appearing at the same interval as the circumference length of the charging roller 12 (the outer diameter of 12 mm) (hereinafter referred to as "streaks in a charging roller cycle").

Note that the streaks in the drum cycle are caused by deformation of the photosensitive drum 11, and the streaks in the charging roller cycle are caused by deformation of the charging roller 12.

(Visualization of Distribution of Fog Toner)

Figure 13A:
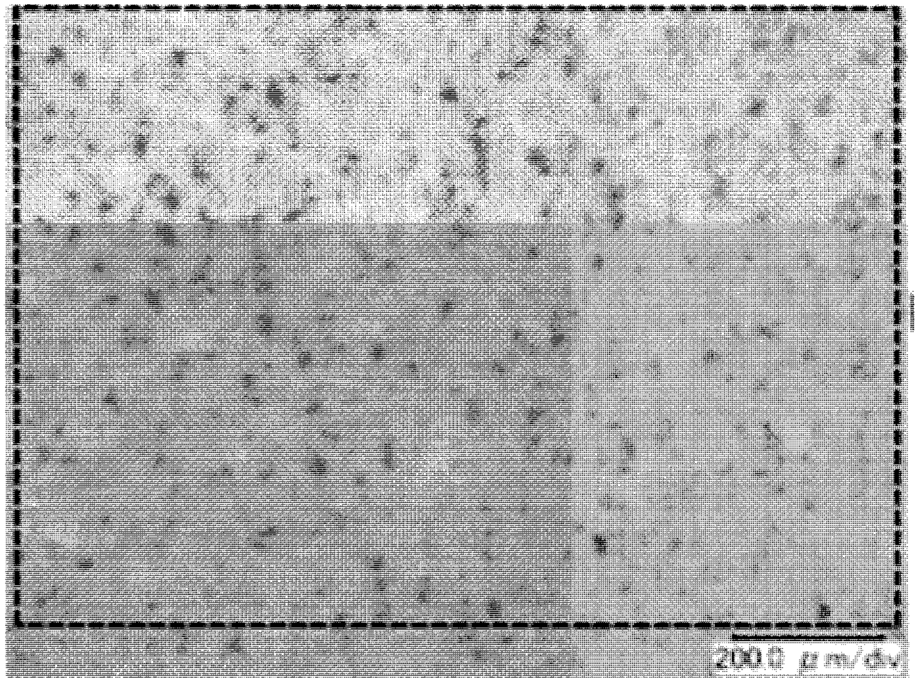
FIG. 13A is a diagram illustrating a surface image of a sampling tape used for fog measurement.

FIG. 13A is an observation image of the surface of the sampling tape 92 (FIGS. 9B and 9C) peeled off from the surface of the photosensitive drum 11 during the fog evaluation described above. For the observation, a microscope "AR-1260" manufactured by Seimitsu Wave Co., Ltd. is used. The observation range is 0.9 mm in length in the circumferential direction of the photosensitive drum 11 and 1.2 mm in length in the axial direction of the photosensitive drum 11, and the magnification is 160 times.

Figure 13B:
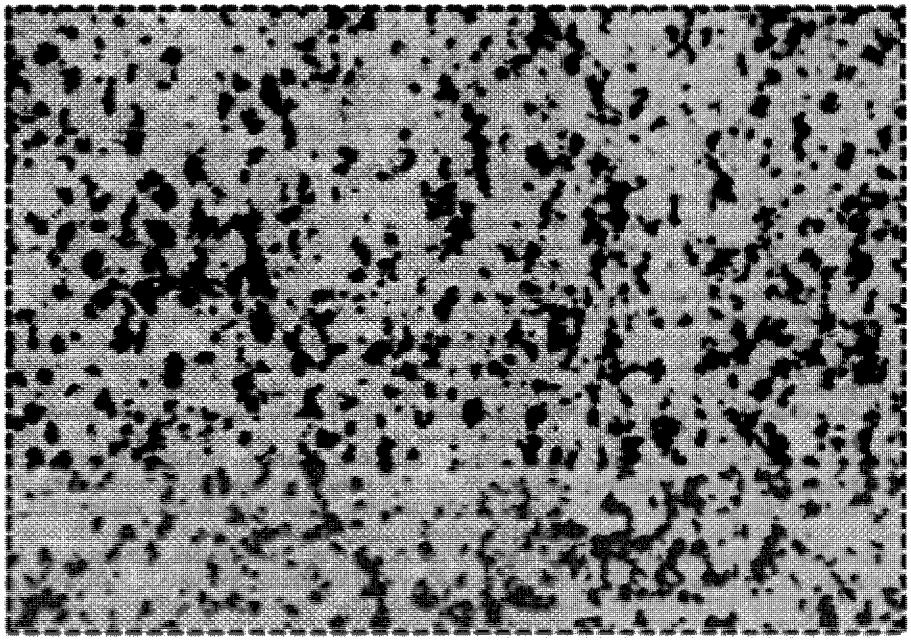
FIG. 13B is a diagram illustrating a binarized image of the surface image.

Next, the observed image of the surface of the collection tape 92 (FIG. 13A) is binarized using image analysis software Image-J. FIG. 13B is a diagram illustrating an example of the binarized image. As illustrated in FIG. 13B, colored portions in the binarized image are portions to which the fog toner adheres (the fog toner adhering portions).

Based on the binarized image of FIG. 13B, an area (pixels) of each of the fog toner adhering portions is calculated and a number (pieces) of and a total area (pixels) of the fog toner adhering portions in a range of 0.9 mm by 1.2 mm are calculated. However, minute areas of 5 (pixels) or less are excluded from the calculation.

In a case where negatively-charged toner is used, positively-charged toner (reversely-charged toner) or insufficiently charged toner (lowly charged toner) adheres to non-exposed portions (negative potential portions) of the photosensitive drum 11, which causes fog. As the absolute value of the surface potential of the non-exposed portions of the photosensitive drum 11 increases, the fog toner tends to adhere. Therefore, the fog toner adhering portions in the binarized image (FIG. 13B) can be considered as portions where the surface potential of the photosensitive drum 11 is locally high (also referred to as high potential portions).

(Contact Area Ratio)

Figure 14:
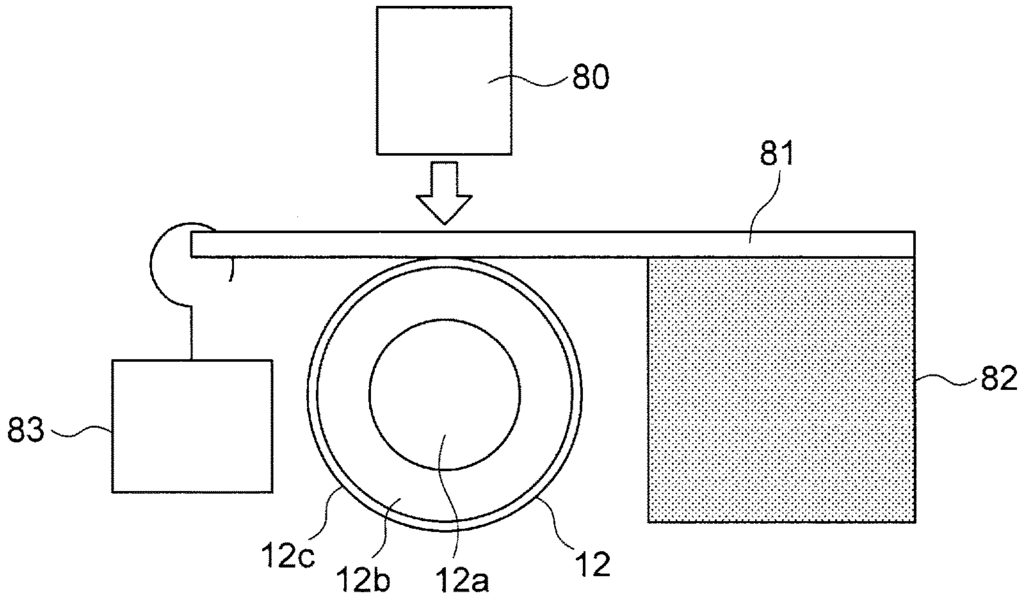
FIG. 14 is a diagram conceptually illustrating a method of photographing a surface image of a charging roller according to a second embodiment.

Next, a contact area ratio between the charging roller 12 and the photosensitive drum 11 is described. FIG. 14 is a diagram illustrating a method of measuring the contact area ratio. A confocal microscope "HYBRID_L3" manufactured by Lasertec Corporation is used as a microscope 80, and the charging roller 12 is arranged immediately below the microscope 80.

A transparent plate 81 (object) made of glass is placed horizontally on the vertex of the charging roller 12. One end of the transparent plate 81 is fixed to a pedestal 82, and a weight 83 is attached to the other end of the transparent plate 81. The weight of the weight 83 is 60 g. As a result, the transparent plate 81 is pressed against the charging roller 12 by the weight of the weight 83.

The weight (60 g) of the weight 83 is determined so as to obtain the nip pressure between the photosensitive drum 11 and the charging roller 12 during the image formation. The weight W of the weight 83 is determined by the following formula, when the nip pressure between the photosensitive drum 11 and the charging roller 12 during the image formation is 700 (gf), the width of the transparent plate 81 is 26 mm, and the length of a roller portion of the charging roller 12 (that is, the length of the elastic layer 12*b* in the axial direction) is 300 mm. W=700 g×26 mm/305 mm=60 g The contact area between the charging roller 12 and the transparent plate 81 has a width of 0.8 mm in the circumferential direction of the charging roller 12 and a length of 1.5 mm in the axial direction of the charging roller 12. The contact area between the charging roller 12 and the transparent plate 81 is observed with the microscope 80 through the transparent plate 81 as indicated by the arrow illustrated in FIG. 14. Of the contact area, an area (referred to as an observation area) of 800 μm in the circumferential direction of the charging roller and 1500 μm in the axial direction of the charging roller is observed with the microscope 80. The area of the observation area is 800 μm×1500 μm=1,200,000 μm2 (1.2 mm2).

When the observation area is observed with the microscope 80, the portions where the convex portions of the charging roller 12 and the transparent plate 81 are in contact appears discolored. The area of the contact portions (that is, the convex portions) is calculated using analysis software attached to the confocal microscope as the microscope 80. However, points of 7 μm2 or less are excluded from the area calculation.

A contact area ratio S is calculated by dividing the total area (μm2) of the contact portions included in the observation area by the area (μm2) of the observation area. Also, the number of the contact portions included in the observation area is counted.

(Surface Roughness and Hardness)

Next, measurements of the surface roughness and hardness of the charging roller 12 are described. As the surface roughness of the charging roller 12, the ten-point average roughness Rz (μm) and the average interval Sm (μm) between the unevenness are measured. The ten-point average roughness Rz (μm) and the average interval Sm (μm) of the unevenness are in accordance with JIS B0601:1994 and are measured using a surface roughness measuring instrument "Surfcorder SEF3500" (manufactured by Kosaka Laboratory Ltd.).

As the hardness of the charging roller 12, the Asker C hardness (degrees) is measured. The Asker C hardness is measured using a micro rubber hardness tester "MD-1capa (Type_A)" manufactured by Kobunshi Keiki Co., Ltd.

EXAMPLES AND COMPARATIVE EXAMPLES

Seven types of charging rollers 12 are produced as Examples 2-1 to 2-4 and Comparative Examples 2-1 to 2-3. The core metal 12*a* of the charging roller 12 of Examples 2-1 to 2-4 and Comparative Examples 2-1 to 2-3 is free-cutting steel (SUM) plated with electroless nickel and has the outer diameter of 8 mm.

Example 2-1

The charging roller 12 of Example 2-1 is produced by forming the elastic layer 12*b* and the surface layer 12*c* on the surface of the core metal 12*a*. To 100 (parts by weight) of epichlorohydrin rubber, 0.5 (parts by weight) of sodium trifluoroacetate as a conductivity-imparting agent, 3 (parts by weight) of zinc oxide, 2 (parts by weight) of stearic acid, and 1.5 (parts by weight) of a cross-linking agent is added to obtain a rubber composition. Further, the rubber composition is kneaded with a roll mixer, the kneaded rubber composition is made into a sheet-like dough, wound on the surface of the core metal 12*a* and press-molded to obtain the elastic layer 12*b* made of crosslinked epichlorohydrin rubber.

The surface of the elastic layer 12*b* is polished with a polishing machine. Specifically, after polishing with the polishing machine to thereby adjust the surface of the elastic layer 12*b* to a predetermined thickness, the surface of the elastic layer 12*b* is dry-polished with sequentially raising the rotation speed of the grinding wheel of the polishing machine to 1000 rpm, 2000 rpm, and 3000 rpm.

The surface layer 12*c* is formed as follows. 10.8 (parts by weight) of polyol, 9.1 (parts by weight) of isocyanate compound, 18.4 (parts by weight) of carbon dispersion liquid, 1.0 (parts by weight) of additive acrylic silicone polymer, porous urethane particles having an average particle size of 10 μm serving as surface roughness imparting agent are mixed. The surface layer 12*c* is formed by spray-coating the mixed solution on the surface of the elastic layer 12*b* and drying the solution of the surface of the elastic layer 12*b* in an electric furnace to evaporate the solvent.

Example 2-2

The charging roller 12 of Example 2-2 is produced in the same way as in Example 2-1 except for the amount of porous urethane particles added thereto, thereby has the surface roughness different from that of Example 2-1. Specifically, the amount of the porous urethane particles added in Example 2-2 is 0.7 times the amount of the porous urethane particles added in Example 2-1.

Example 2-3

The charging roller 12 of Example 2-3 is produced in the same way as in Example 2-1 except for the amount of porous urethane particles added thereto, thereby has the surface roughness different from that of Example 2-1. Specifically, the amount of the porous urethane particles added in Example 2-3 is 0.5 times the amount of the porous urethane particles added in Example 2-1.

Example 2-4

The charging roller 12 of Example 2-4 is produced in the same way as in Example 2-1 except for the amount of porous urethane particles added thereto, thereby has the surface roughness different from that of Example 2-1. Specifically, the amount of the porous urethane particles added in Example 2-4 is 0.3 times the amount of the porous urethane particles added in Example 2-1.

Comparative Example 2-1

The charging roller 12 of Comparative Example 2-1 is manufactured in the same manner as in Example 2-1 except for the molecular weight of the polyol of the surface layer 12*c*, thereby reducing the crosslink density of the surface layer 12*c*. Specifically, the molecular weight of the polyol of Comparative Example 2-1 is doubled with respect to the molecular weight of the polyol of Example 2-1.

Comparative Example 2-2

The charging roller 12 of Comparative Example 2-2 is produced as follows. The charging roller 12 of Comparative Example 2-2 is produced by polishing the surface of the elastic layer 12*b* described in Example 2-1 so that polishing marks are formed in the circumferential direction with the ten-point average roughness Rz (JIS B0601:1994) in the axial direction being 10 to 20 μm and the average interval Sm (μm) between the unevenness being 0.08 to 0.15 mm. After that, the surface of the elastic layer 12*b* is surface-treated. The surface treatment liquid is prepared by mixing and dissolving 10 parts by mass of an isocyanate compound (MDI) in 90 parts by mass of ethyl acetate. A surface treatment layer is formed on the surface of the layer 12*b* by immersing the roll-molded product (the core metal 12*a* with the elastic layer 12 formed thereon) for 30 seconds while maintaining the surface treatment liquid at the temperature of 23° C., and then heating it in an oven maintained at the temperature of 120° C. for one hour.

Comparative Example 2-3

The charging roller 12 of Comparative Example 2-3 is produced as follows. The elastic layer 12*b* is made by mixing 100 (parts by weight) of epichlorohydrin rubber with 1.3 to 1.6 (parts by weight) of a peroxide cross-linking agent with further adding various additives such as fillers, cross-linking aids, and cross-linking accelerators, and molding the mixture. The surface layer 12*c* is formed by coating the surface of the elastic layer 12*b* with a mixture of N-methoxymethylated nylon and non-porous nylon resin particles having an average particle size of 30 μm.

(Evaluation Results)

For each of the charging rollers 12 of Examples 2-1 to 2-4 and Comparative Examples 2-1 to 2-3, the ten-point average roughness Rz (μm), the average interval Sm (μm) between the unevenness, and the Asker C hardness (degrees) are measured. The measuring method is the same as described in a first embodiment.

For each of the charging rollers 12 of Examples 2-1 to 2-4 and Comparative Examples 2-1 to 2-3, the contact area ratio S (%) and the number of the contact portions in the observation area are measured in the manner described with reference to FIG. 14.

Further, for each of the charging rollers 12 of Examples 2-1 to 2-4 and Comparative Examples 2-1 to 2-3, the hue difference ΔE representing fog is measured, and the presence or absence of streaks after the printing test is evaluated. Regarding the evaluation of streaks, the presence or absence of streaks in the drum cycle and streaks in the charge roller cycle are evaluated.

Further, for each of the charging rollers 12 of Examples 2-1 to 2-4 and Comparative Examples 2-1 to 2-3, a total area (pixels) of the fog toner adhering portions in the binarized image (FIG. 13B) of the sampling tape (which correspond to the high potential portions of the photosensitive drum 11), a number of the fog toner adhering portions, and an average of areas (pixels) of the fog toner adhering portions are measured. The measured results are illustrated in Tables 2, 3, and 4.

TABLE 2

| Examples/ Comparative Examples | Surface layer: Method of adding roughness | Surface layer: Amount of particles added (Relative value) | Surface roughness: Rz (μm) | Surface roughness: Sm (μm) | Asker C hardness (degrees) |
|---|---|---|---|---|---|
| Example 2-1 | Particles (10 μm) | 1.0 | 24.1 | 0.165 | 78 |
| Example 2-2 | Particles (10 μm) | 0.7 | 16.1 | 0.143 | 79 |
| Example 2-3 | Particles (10 μm) | 0.5 | 11.8 | 0.134 | 79 |
| Example 2-4 | Particles (10 μm) | 0.3 | 7.8 | 0.295 | 79 |
| Comparative Example 2-1 | Particles (10 μm) | 1.0 | 19.3 | 0.151 | 78 |
| Comparative Example 2-2 | Polish | None | 16.8 | 0.102 | 77 |
| Comparative Example 2-3 | Particles (30 μm) | 0.1 | 11.2 | 0.284 | 78 |

TABLE 3

| Examples/ Comparative Examples | Surface observation results: Contact area ratio S (%) | Surface observation results: Number of contact portions | Fog: Hue difference ΔE | Occurrence state of streaks: Streaks with drum cycle | Occurrence state of streaks: Streaks with charging roller cycle |
|---|---|---|---|---|---|
| Example 2-1 | 0.17 | 80 | 1.60 | None | None |
| Example 2-2 | 0.12 | 62 | 1.46 | None | None |
| Example 2-3 | 0.12 | 57 | 1.21 | None | None |
| Example 2-4 | 0.08 | 37 | 1.17 | None | Occur |
| Comparative Example 2-1 | 0.61 | 139 | 2.01 | None | None |
| Comparative Example 2-2 | 2.43 | 909 | 3.76 | None | None |
| Comparative Example 2-3 | 0.45 | 98 | 1.68 | None | None |

TABLE 4

| Examples/ | Fog toner adhering portions in binarized image (High potential portions of photosensitive drum) | | |
|---|---|---|---|
| Comparative Examples | Total area (pixel) | Number | Average area (pixel) |
| Example 2-1 | 18058 | 526 | 34.3 |
| Example 2-2 | 11038 | 431 | 25.6 |
| Example 2-3 | 9512 | 460 | 20.7 |
| Example 2-4 | 6895 | 324 | 21.3 |
| Comparative Example 2-1 | 29083 | 656 | 44.3 |
| Comparative Example 2-2 | 54928 | 794 | 69.2 |
| Comparative Example 2-3 | 18732 | 513 | 36.5 |

Figure 15:
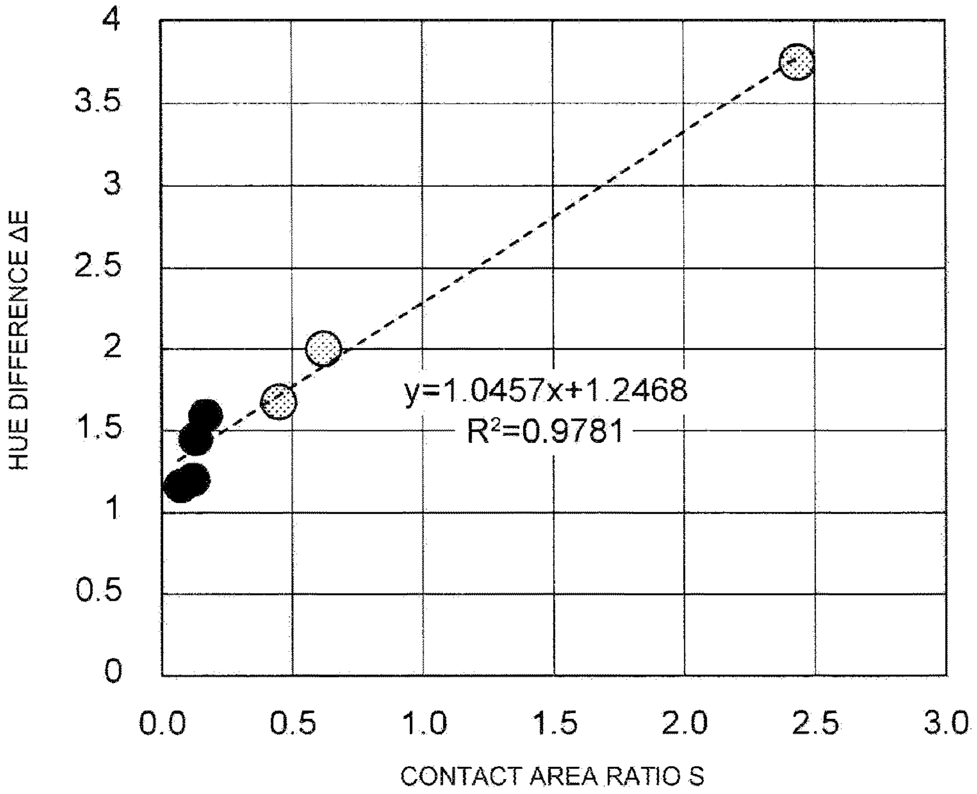
FIG. 15 is a graph illustrating a relationship between a hue difference ΔE (fog) and a contact area ratio of the charging roller according to Examples 2-1 to 2-4 and Comparative Examples 2-1 to 2-3.
Figure 16A:
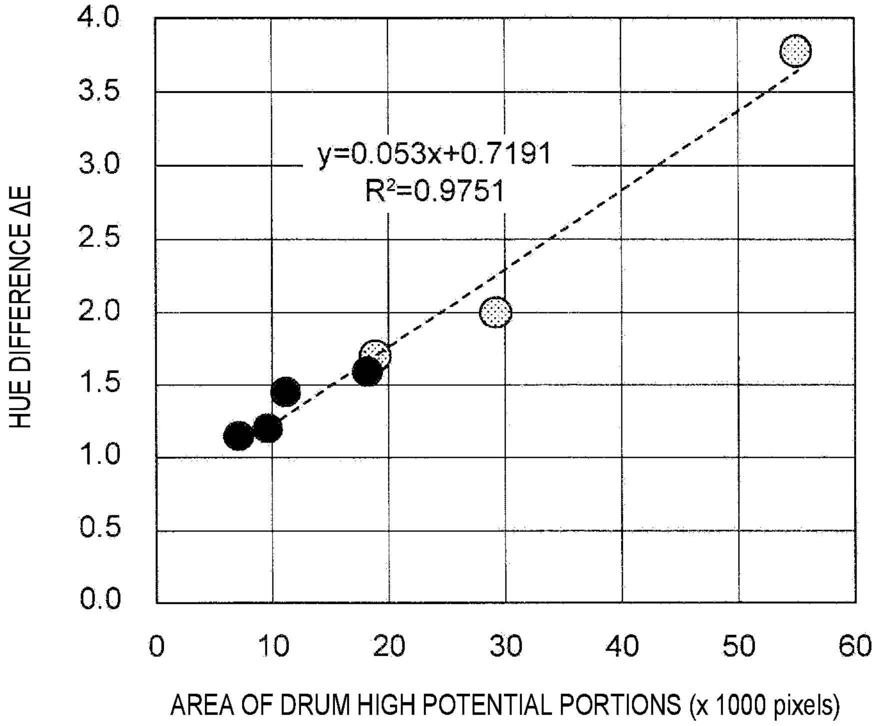
FIG. 16A is a graph illustrating a relationship between the hue difference ΔE (fog) and the area of the high-potential portions of the photosensitive drum according to Examples 2-1 to 2-4 and Comparative Examples 2-1 to 2-3.
Figure 16B:
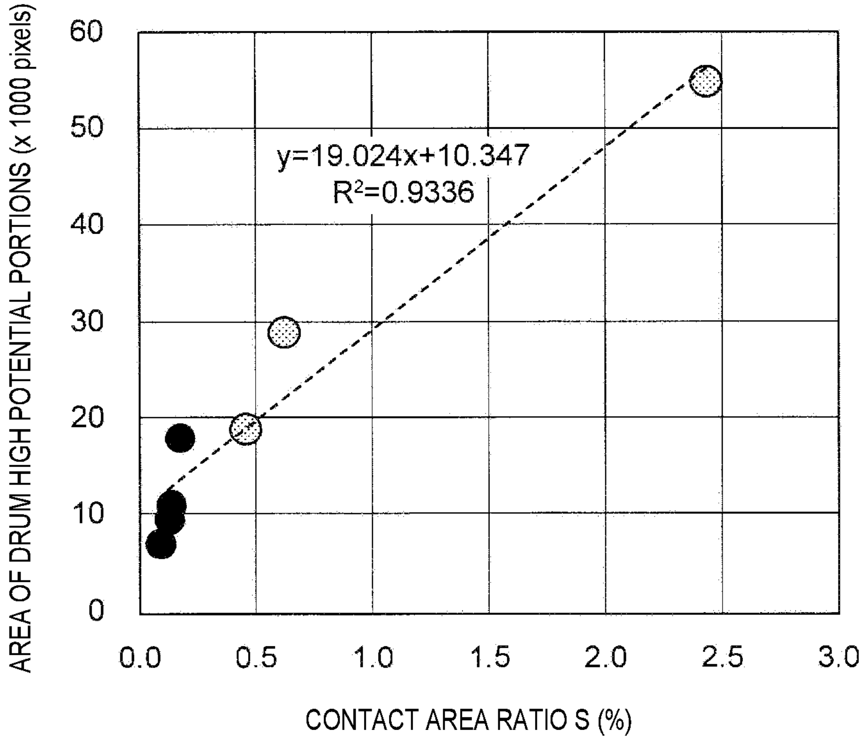
FIG. 16B is a graph illustrating a relationship between a contact area ratio of the charging roller and the area of the high-potential portions of the photosensitive drum according to Examples 2-1 to 2-4 and Comparative Examples 2-1 to 2-3.

FIG. 15 is a graph illustrating a relationship between the contact area ratio S and the hue difference ΔE (fog). FIG. 16A is a graph illustrating a relationship between the hue difference ΔE and the total area of the fog toner adhering portions (that is, the total area of the high potential portions of the photosensitive drum) in the binarized image. FIG. 16B is a graph illustrating a relationship between the contact area ratio S and a total area of fog toner adhering portions (portions to which the fog toner is attached) in the binarized image. In FIGS. 16A and 16B, black circles indicate Examples 2-1 to 2-4, and dotted circles indicate Comparative Examples 2-1 to 2-3.

As illustrated in FIG. 15, the larger the contact area ratio S, the larger the hue difference ΔE, in other words, the more likely the fog occurs. Also, from each plot in FIG. 15, an approximate straight line y=1.0457x+1.2468, where "x" is the contact area ratio S and "y" is the hue difference ΔE, is obtained. The intersection of this straight line and y=1.60 is x=0.34%.

From FIG. 15, it can be seen that in the case where the contact area ratio S is greater than 0.34% (in the case of Comparative Examples 2-1 to 2-3), the hue difference ΔE is greater than 1.6 and the occurrence of fog is observed.

On the other hand, when the contact area ratio S is 0.34% or less (Examples 2-1 to 2-4), the hue difference ΔE is 1.6 or less, which suppresses the occurrence of fog.

As illustrated in FIG. 16A, the hue difference ΔE increases as the high potential portions of the photosensitive drum 11 increases. As illustrated in FIG. 16B, the hue difference ΔE increases as the contact area ratio S increases. Accordingly, it can be seen that by reducing the contact area ratio S, it is possible to reduce the locally high-potential portions of the photosensitive drum 11, which reduces the occurrence of fog.

If the contact area ratio S is 0.34% or less, the occurrence of fog is suppressed. However, if the contact area ratio S is less than 0.08%, a low potential portions may occur on the surface of the photosensitive drum 11, which may cause minute streaks. Therefore, it may be most preferable that the contact area ratio S is within a range from 0.08% to 0.34%.

Further, even if the contact area ratio S is within the range of 0.08% to %, the number of the contact portions in the observation area (1.2 mm2) of the charging roller 12 is less than 57 (Example 2-4), streaks are observed in the cycle of the charging roller. This is because the smaller the number of the contact portions (the convex portions) of the surface of the charging roller 12 with the photosensitive drum 11, the more the nip pressure between the charging roller 12 and the photosensitive drum 11 concentrates on each contact portion, which facilitates deformation of the urethane particle(s) contained in the contact portion.

By setting the number of the contact portions in the observation area of the charging roller 12 to 57 or more, even if the charging roller 12 and the photosensitive drum 11 are left in pressure contact with each other for a long period of time, the change in the surface state of the charging roller 12 is less likely to occur and the occurrence of streaks (particularly, streaks in the cycle of the charging roller) can be suppressed.

Further, like as described in a first embodiment, the surface area ratio of the surface layer 12*c* of the charging roller 12 is 68.4% or more (preferably within the range from 68.4% to 90.9%), it is possible to suppress the occurrence of streaks due to exudation of a component(s) of the elastic layer 12*b*. Further, since the maximum height of the convex portions is in the range from 14.3 μm to 34.7 μm, the surface potential of the charging roller 12 can be stabilized and the occurrence of fog can be suppressed.

Effects of Second Embodiment

As described above, the charging device 3 according to a second embodiment includes the charging roller 12 serving as the charging member, the photosensitive drum 11 serving as the contact member in contact with the charging roller 12 at the predetermined nip pressure. The charging roller 12 includes the core metal (the shaft) 12*a*, the elastic layer 12*b*, and the surface layer 12*c* containing the porous particles 12*d*. In the state where the transparent plate 81 is pressed against the surface layer 12*c* with the predetermined nip pressure, the ratio of the contact area (the contact area ratio S) between the surface layer 12*c* and the transparent plate 81 per predetermined area is 0.34% or less, and the number of the contact portions per the predetermined area is 57 or more.

Since the contact area ratio S is 0.34% or less, it is possible to reduce the locally high-potential portions on the surface of the photosensitive drum 11, which suppresses the occurrence of fog. Moreover, since the number of the contact portions is 57 or more, it is possible to suppress deformation of the charging roller 12, which suppresses the occurrence of streaks. Moreover, since the surface layer 12*c* includes the porous particles 12*d*, it is possible to suppress the occurrence of streaks due to exudate of a component(s) of the elastic layer 12*b*.

In particular, in addition to the above-described effects, since the contact area ratio S is within the range of 0.08% to 0.34%, the surface potential of the charging roller 12 is stabilized and printing defects such as streaks are suppressed.

Third Embodiment

Next, a third embodiment is described. In the charging roller 12 according first and second embodiments described above, the occurrence of the fog is suppressed by the porous particles (for example, the urethane particles) in the surface layer 12*c*. However, if the charging roller 12 is left for a long period of time, permanent deformation may occur and streaks at the interval corresponding to the circumferential length of the charging roller 12 may occur. For example, it has been confirmed that streaks occur when the charging roller 12 is left in an environment of the temperature of 50° C. and the relative humidity of 90% for 6 days. Thus, suppression of the streaks may be an issue.

Therefore, in a third embodiment, the hardness of the surface layer 12*c* is adjusted by changing the cross-linking density of the urethane-based polymer of the surface layer 12*c*, the amount of the curing agent contained in the urethane-based polymer, or the like within the scope of the charging roller 12 defined in first and second embodiments described above, so as to suppress the occurrence of streaks when the charging roller 12 is left for a long period of time.

Here, seven types of charging rollers 12 of Examples 3-1 to 3-3 and Comparative Examples 3-1 to 3-4 are produced with the hardness adjusted as illustrated in Table 5, and Martens hardness A (Mpa) thereof are measured (Note that Comparative Examples 3-5 is described later). As described above, the hardness of the charging roller 12 is adjusted by changing the crosslink density of the urethane-based polymer of the surface layer 12*c*, the amount of the curing agent contained in the urethane-based polymer, or the like.

TABLE 5

| Examples/ Comparative Examples | Surface layer Martens hardness (MPa) | Occurrence of Streaks: Streaks with drum cycle | Occurrence of Streaks: Streaks with charging roller cycle |
|---|---|---|---|
| Example 3-1 | 4.8 | None | None |
| Example 3-2 | 5.1 | None | None |
| Example 3-3 | 7.1 | None | None |
| Comparative Example 3-1 | 3.7 | Occur | None |
| Comparative Example 3-2 | 4.4 | Occur | None |
| Comparative Example 3-3 | 12.6 | None | Occur |
| Comparative Example 3-4 | 14.8 | None | Occur |
| Comparative Example 3-5 | 8.2 | None | Occur |

Note that in the charging rollers 12 of Examples 3-1 to 3-3 and Comparative Examples 3-1 to 3-4, the surface area ratio A of the convex portions of the surface layer 12*c* is 68.4% or more (preferably in the range of 68.4% to 90.9%) and the maximum height H of the convex portions is in the range from 14.3 μm to 34.7 μm as described in a first embodiment, and the contact area ratio S is 0.34% (preferably in the range from 0.08% to 0.34%) as described in a second embodiment.

Figure 17:
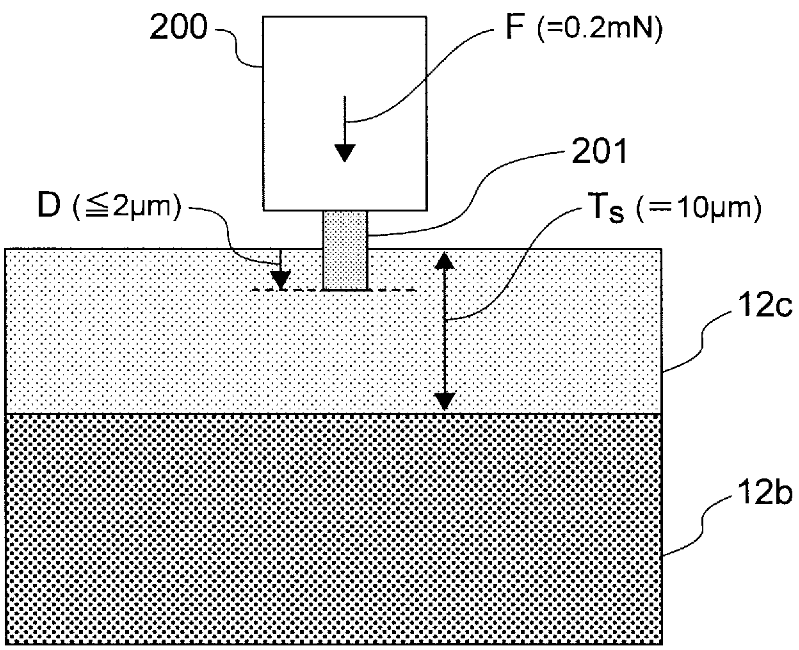
FIG. 17 is a schematic diagram for explaining a method of measuring the Martens hardness of the surface layer of the charging roller according to a third embodiment.

FIG. 17 is a schematic diagram illustrating a method of measuring the Martens hardness of the charging roller 12. "Nanoindenter" manufactured by Toyo Technica Co., Ltd. is used to measure the Martens hardness. As illustrated in FIG. 17, the Martens hardness is measured by vertically pushing a needle 201 of a displacement meter 200 into the surface layer 12*c* of the charging roller 12, stopping the pushing of the needle 201 when the pushing load F reaches 0.2 mN, and removing the load applied to the needle 201 after 10 seconds.

The thickness Ts of the surface layer 12*c* of the charging roller 12 is set to approximately 10 μm. Generally, in measurement with the nanoindenter, it may be necessary to suppress a measurement depth D to 20% or less of the thickness Ts of the surface layer 12*c* (the distance from the surface of the surface layer 12*c* to the elastic layer 12*b*). Therefore, in a third embodiment, the measurement depth D is set to approximately 2 μm or less.

The charging roller 12 of each of Examples 3-1 to 3-3 and Comparative Examples 3-1 to 3-4 illustrated in Table 5 is incorporated into the image formation unit 10M together with the photosensitive drum 11 so as to form the nip between the charging roller 12 and the photosensitive drum 11, and left for 6 days under the temperature of 50° C. and the relative humidity of 90%.

The storage stability of the charging roller 12 is evaluated in the same manner as described in a first embodiment. That is, a printing test is performed with the image formation unit 10M being installed to the image formation apparatus 1 after the image formation unit 10M is left for 6 days. The conditions of the printing test are the same as described in a first embodiment.

The printed pattern is visually observed to determine whether there are streaks with the cycle (the drum cycle) corresponding to the circumferential length of the photosensitive drum 11 and whether there are streaks with the cycle (the charging roller cycle) corresponding to the circumferential length of the charging roller 12. As a result of the visual observation, when the streaks are observed, the storage stability is evaluated as "poor". If no streaks are observed, the storage stability is evaluated as "good".

From the results illustrated in Table 5, it can be seen that the higher the Martens hardness of the surface layer 12*c* of the charging roller 12, the more streaks with the charging roller cycle occur. These streaks are due to permanent deformation. That is, it is considered that when the surface layer 12*c* is deformed, the deformed surface layer 12*c* is difficult to return to its original state.

Conversely, the lower the Martens hardness of the surface layer 12*c* of the charging roller 12, the more streaks in the drum cycle occur. These streaks are caused by contamination due to deposition (exudation) of the oligomer component from the elastic layer 12*b* of the charging roller 12. That is, it is considered that the surface layer 12*c* of the charging roller 12 is damaged and the oligomer component of the elastic layer 12*b* is deposited.

Figure 18A:
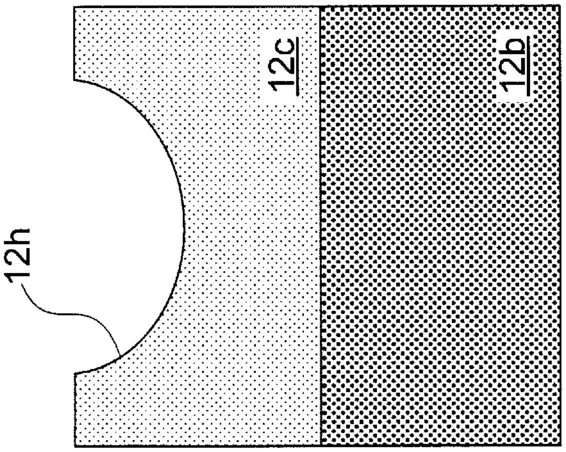
FIGS. 18A, 18B, and 18C are diagrams conceptually illustrating surface states of the charging rollers of Examples 3-1 to 3-3 and Comparative Examples 3-1 to 3-5 after storage stability evaluation.
Figure 18B:
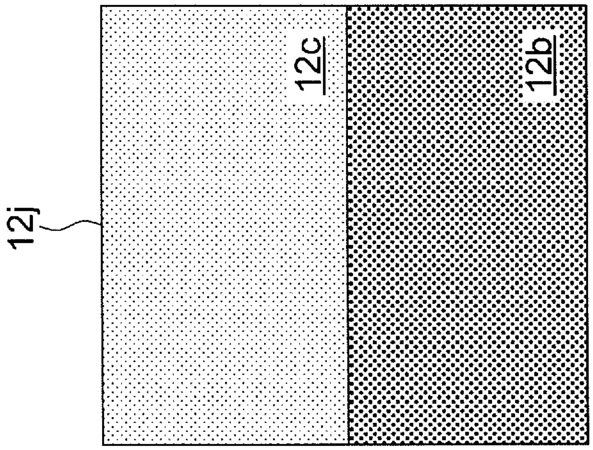
Figure 18C:
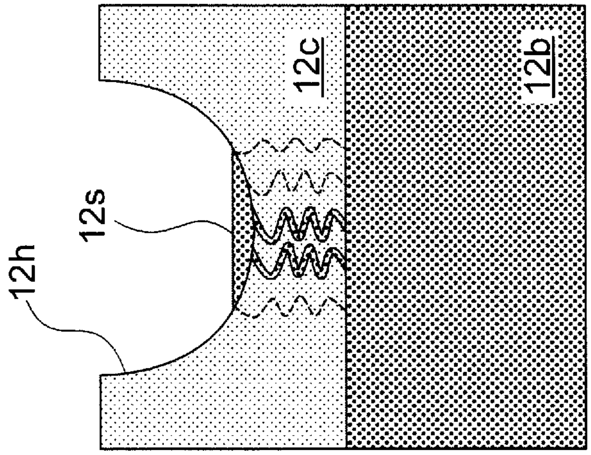

FIGS. 18A, 18B and 18C schematically illustrate the states of the surface layer 12*c* of the charging roller 12 after the storage. FIG. 18A illustrates the state of the surface layer 12*c* of the charging roller 12 of Comparative Examples 3-3 and 3-4. In the charging roller 12 of each of Comparative Examples 3-3 and 3-4, distortion of the surface layer 12*c* (indicated by reference numeral 12*h*) does not recover, even when the load is removed between the charging roller 12 and the photosensitive drum 11 after the charging roller 12 and the photosensitive drum 11 are left for 6 days in the state in which the nip is formed between the charging roller 12 and the photosensitive drum 11.

FIG. 18B illustrates the state of the surface layer 12*c* of the charging roller 12 of Examples 3-1 to 3-3. In the charging rollers 12 of each of Examples 3-1 to 3-3, distortion of the surface layer 12*c* recovers as indicated by the reference numeral 12*j*, when the load is removed between the charging roller 12 and the photosensitive drum 11 after the charging roller 12 and the photosensitive drum 11 are left for 6 days in the state in which the nip is formed between the charging roller 12 and the photosensitive drum 11.

FIG. 18C illustrates the state of the surface layer 12*c* of the charging roller 12 of Comparative Examples 3-1 and 3-2. In the charging rollers 12 of each of Comparative Examples 3-1 to 3-2, the surface layer 12*c* is damaged to form cracks and the oligomer component (indicated by reference numeral 12*s*) of the elastic layer 12*b* is precipitated through the cracks, if the charging roller 12 and the photosensitive drum 11 are left for 6 days in the state in which the nip is formed between the charging roller 12 and the photosensitive drum 11.

That is, the permanent deformation due to the storage for the long time and the precipitation of the oligomer component both change depending on the Martens hardness of the surface layer 12*c*, but they have a trade-off relationship with each other.

From the results illustrated in Table 5, it can be conceivable that when the Martens hardness A is in the range of 4.8 to 7.1 Mpa (that is, Examples 3-1 to 3-3), the permanent deformation due to a long-term storage and the precipitation of the oligomer component are suppressed, which suppress both the occurrence of streaks with the drum cycle and streaks with the charging roller cycle.

As Comparative Example 3-5, the charging roller 12 of Comparative Example 3-5 is produced by adding nylon particles to the surface layer 12*c* of the charging roller 12 of Comparative Example 1-2 so as to set the Martens hardness A to 8.2 Mpa. As a result of the storage stability evaluation on charging roller 12 of Comparative Example 3-5, no streaks with the drum cycle are observed, but streaks with the charging roller cycle are observed. The value of 8.2 Mpa of the Martens hardness A is out of the above-described good range (4.8 to 7.1 Mpa). This is consistent with the results obtained from Examples 3-1 to 3-3 and Modifications 3-1 to 3-4.

Effects of Third Embodiment

As described above, in the charging device 3 according to a third embodiment, the Martens hardness A of the surface layer 12*c* of the charging roller 12 is in the range of 4.8 to 7.1 Mpa, and thus it is possible to suppress the occurrence of streaks even when the charging roller 12 is left for a long period of time.

In second and third embodiments described above, as described in a first embodiment, the porous particles 12*d* of the surface layer 12*c* of the charging roller 12 are not limited to the urethane particles, and may be other porous particles. Moreover, the polymer constituting the surface layer 12*c* is not limited to the urethane-based polymer, and may be other polymers.

Moreover, the charging device 3 only needs to include the charging roller 12 and the contact member that contacts the charging roller 12. The contact member is the photosensitive drum 11 in an above-described example, but may be the cleaning roller 13.

Although one or more embodiments and modifications have been described above, the disclosure is not limited thereto, and various improvements or modifications can be made.

The disclosure can be used for an image formation apparatus that forms an image on a medium, such as printers, copiers, facsimile machines, and MFPs (Multi Function Peripherals).

The invention includes other embodiments or modifications in addition to one or more embodiments and modifications described above without departing from the spirit of the invention. The one or more embodiments and modifications described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A charging device comprising:

a charging member that is rotatable and provided to be in contact with a contact member, wherein the charging member includes: a shaft; a surface layer to be in contact with the contact member and containing porous particles; and an elastic layer provided between the shaft and the surface layer, a ratio of convex portions formed by the porous particles on the surface layer to a surface area of the surface layer is 68.4% or more, the charging member is configured to be pressed against the contact member with a predetermined nip pressure, and the charging member is provided such that, in a condition where the contact member is brought into contact with the charging member at the predetermined nip pressure, a ratio of an area of contact portions between the charging member and the contact member per predetermined area is 0.34% or less, and a number of the contact portions per the predetermined area is 57 or more.

2. The charging device according to claim 1, wherein the ratio of the convex portions to the surface area of the surface layer is 90.9% or less.

3. The charging device according to claim 1, wherein a height of the convex portions of the surface layer is 14.3 μm or more and 34.7 μm or less.

4. The charging device according to claim 1, wherein the porous particles contain urethane as a main component thereof.

5. The charging device according to claim 1, wherein the surface layer contains a urethane-based polymer as a main component of the surface layer.

6. The charging device according to claim 1, wherein

Martens hardness of the surface layer is 4.8 Mpa or more and 7.1 Mpa or less.

7. The charging device according to claim 1, wherein the contact member comprises an image carrier configured to carry an electrostatic latent image thereon.

8. The charging device according to claim 1, wherein the contact member comprises a cleaning member configured to remove foreign matter from the surface of the charging member.

9. The charging device according to claim 1, wherein the ratio of the area of the contact portions between the charging member and the contact member per the predetermined area is 0.08% or more.

10. The charging device according to claim 1, wherein the ratio of the area of the contact portions between the charging member and the contact member per the predetermined area and the number of the contact portions per the predetermined area are measured under a condition where an object is pressed against the surface layer at the predetermined nip pressure.

11. An image formation apparatus comprising:

the charging device according to claim 1;

an exposure device configured to form a latent image on a surface of an image carrier that is charged by the charging member;

a development device configured to develop the latent image formed on the surface of the image carrier with a developer to form a developer image; and a fixation device configured to fix the developer image that is developed by the development device and transferred onto a medium to the medium.

12. A charging device comprising:

a charging member that is rotatable and provided to be in contact with a contact member, wherein the charging member includes: a shaft; a surface layer to be in contact with the contact member at a predetermined nip pressure and containing porous particles; and an elastic layer provided between the shaft and the surface layer, and the charging member is provided such that, in a condition where the contact member is in contact with the charging member at the predetermined nip pressure, a ratio of an area of contact portions between the charging member and the contact member per predetermined area is 0.34% or less, and a number of the contact portions per the predetermined area is 57 or more.

* * * * *